United States Patent
Matsumoto

(10) Patent No.: US 9,115,301 B2
(45) Date of Patent: Aug. 25, 2015

(54) LUBRICATING OIL COMPOSITION FOR CHILLER

(75) Inventor: Tomoya Matsumoto, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 146 days.

(21) Appl. No.: 13/636,440

(22) PCT Filed: Mar. 24, 2011

(86) PCT No.: PCT/JP2011/057240
§ 371 (c)(1),
(2), (4) Date: Sep. 21, 2012

(87) PCT Pub. No.: WO2011/118732
PCT Pub. Date: Sep. 29, 2011

(65) Prior Publication Data
US 2013/0012419 A1   Jan. 10, 2013

(30) Foreign Application Priority Data

Mar. 25, 2010 (JP) ................................. 2010-071108

(51) Int. Cl.
*C09K 5/04* (2006.01)
*C10M 171/00* (2006.01)

(52) U.S. Cl.
CPC ............ *C09K 5/045* (2013.01); *C10M 171/008* (2013.01); *C09K 2205/126* (2013.01); *C09K 2205/22* (2013.01); *C09K 2205/24* (2013.01); *C10M 2203/024* (2013.01); *C10M 2203/04* (2013.01); *C10M 2207/026* (2013.01); *C10M 2207/042* (2013.01); *C10M 2207/2835* (2013.01); *C10M 2209/043* (2013.01); *C10M 2209/1023* (2013.01); *C10M 2209/1033* (2013.01); *C10M 2209/1055* (2013.01); *C10M 2229/02* (2013.01); *C10N 2220/022* (2013.01); *C10N 2220/301* (2013.01); *C10N 2220/302* (2013.01); *C10N 2230/02* (2013.01); *C10N 2230/10* (2013.01); *C10N 2240/30* (2013.01)

(58) Field of Classification Search
CPC ... C09K 5/04; C09K 2205/00; C09K 2205/12
USPC .................................................... 252/67, 68
See application file for complete search history.

(56) References Cited

U.S. PATENT DOCUMENTS

| | | | |
|---|---|---|---|
| 6,043,200 A | 3/2000 | Carroll et al. | |
| 7,718,083 B2 * | 5/2010 | Kaneko | 252/68 |
| 7,824,567 B2 * | 11/2010 | Kaneko | 252/68 |
| 8,075,796 B2 * | 12/2011 | Rao et al. | 252/67 |
| 8,293,130 B2 * | 10/2012 | Kaneko | 252/67 |
| 8,394,286 B2 * | 3/2013 | Leck et al. | 252/67 |
| 8,426,657 B2 * | 4/2013 | Leck et al. | 570/175 |
| 8,496,846 B2 * | 7/2013 | Rao et al. | 252/67 |
| 8,568,609 B2 * | 10/2013 | Sato et al. | 252/68 |
| 8,703,662 B2 * | 4/2014 | Kaneko et al. | 508/110 |
| 2010/0234256 A1 | 9/2010 | Sato et al. | |
| 2012/0159976 A1 * | 6/2012 | Kontomaris | 62/115 |
| 2013/0221262 A1 * | 8/2013 | Minor et al. | 252/2 |
| 2013/0283834 A1 * | 10/2013 | Rao et al. | 62/119 |

FOREIGN PATENT DOCUMENTS

| | | |
|---|---|---|
| JP | 7 507342 | 8/1995 |
| JP | 2000 510498 | 8/2000 |
| JP | 2006 503961 | 2/2006 |
| JP | 2008 524432 | 7/2008 |
| JP | 2008 208261 | 9/2008 |
| JP | 2009 74018 | 4/2009 |
| JP | 2011 57885 | 3/2011 |
| WO | 2009 019065 | 2/2009 |
| WO | 2009 066722 | 5/2009 |

OTHER PUBLICATIONS

U.S. Appl. No. 13/822,894, filed Mar. 13, 2013, Matusmoto.
International Search Report Issued Jun. 28, 2011 in PCT/JP11/57240 Filed Mar. 24, 2011.

* cited by examiner

*Primary Examiner* — Ellen McAvoy
(74) *Attorney, Agent, or Firm* — Oblon, McClelland, Maier & Neustadt, L.L.P.

(57) ABSTRACT

It is to provide a lubricating oil composition for a refrigerating machine that has a low global warming potential by including in a base oil an organic compound having two or more non-conjugated double bonds in the molecule thereof, and that is particularly preferably used for a refrigerating machine using a refrigerant having a particular structure, such as an unsaturated fluorinated hydrocarbon compound, which is a refrigerant capable of being used for existing car air conditioner system, air conditioners and the like, and that has excellent compatibility with the refrigerant and excellent thermal and chemical stability.

21 Claims, No Drawings

US 9,115,301 B2

LUBRICATING OIL COMPOSITION FOR CHILLER

This application is a National Stage of PCT/JP11/057240 filed Mar. 24, 2011 and claims the benefit of JP 2010-071108 filed Mar. 25, 2010.

TECHNICAL FIELD

The present invention relates to a lubricating oil composition for a refrigerating machine, and more specifically a lubricating oil composition for a refrigerating machine that has a low global warming potential, and that can be particularly preferably used for a refrigerating machine using a refrigerant having a particular structure, such as an unsaturated fluorinated hydrocarbon, which is a refrigerant capable of being used for an existing car air conditioner system and the like.

BACKGROUND ART

In general, a compression refrigerating machine is constituted at least by a compressor, a condenser, an expansion mechanism (such as an expansion valve), an evaporator and optionally a dryer, and has a structure where a mixed liquid of a refrigerant and a lubricating oil (i.e., a refrigerating machine oil) is circulated in a closed system. In the compression refrigerating machine, in general, a high temperature occurs in the compressor, whereas a low temperature occurs in the condenser while depending on the type of the machine, and it is therefore necessary that the refrigerant and the lubricating oil are circulated in the system without phase separation over the wide temperature range of from the low temperature to the high temperature. The refrigerant and the lubricating oil generally have regions where phase separation occurs on the low temperature side and the high temperature side. The maximum temperature of the phase separation region on the low temperature side is preferably $-10°$ C. or less, and particularly preferably $-20°$ C. or less, and the minimum temperature of the phase separation region on the high temperature side is preferably $30°$ C. or more, and particularly preferably $40°$ C. or more. The phase separation that occurs during operation of a refrigerating machine exerts considerable adverse affects on the service life and the efficiency of the machine. For example, the phase separation of the refrigerant and the lubricating oil that occurs in the compressor portion causes lubrication failure in the moving parts therein, which considerably shortens the service life of the machine due to occurrence of seizure or the like, and the phase separation that occurs in the evaporator portion brings about decrease of the heat exchange efficiency due to the presence of the lubricating oil having high viscosity.

As a refrigerant for a refrigerating machine, a chlorofluorocarbon (CFC), a hydrochlorofluorocarbon (HCFC) and the like have been mainly used, but these are compounds containing chlorine, which causes the environmental issue (ozone layer destruction), and therefore an alternative refrigerant containing no chlorine, such as hydrofluorocarbon (HFC), is being studied. As the hydrofluorocarbon, for example, a hydrofluorocarbon, which is represented by 1,1,1,2-tetrafluoroethane, difluoromethane, pentafluoroethane and 1,1,1-trifluoroethane (which are hereinafter referred to as R134a, R32, R125 and R143a, respectively), is receiving attention, and R134a is used, for example, in a car air conditioner system.

In view of potential issue on the global warming of HFC, however, a so-called natural refrigerant, such as carbon dioxide, receives attention as an alternative refrigerant suitable for environmental protection, but carbon dioxide requires a high pressure and thus cannot be used in an existing car air conditioner system.

As a refrigerant that has a low global warming potential and is capable of being used in an existing car air conditioner system, refrigerants that have a particular polar structure in the molecule thereof have been found, for example, the unsaturated fluorinated hydrocarbon compound disclosed in Patent Document 1, and the fluorinated ether compound, the fluorinated alcohol compound and the fluorinated ketone compound disclosed in Patent Document 2.

Furthermore, Patent Documents 3, 4 and 5 disclose the techniques of including the terpene compound or the ester compound of the particular fatty acid and polyhydric alcohol in a base oil for the purpose of achieving the thermal and chemical stability and the refrigerant compatibility at high levels even upon using with the aforementioned refrigerants.

A lubricating oil for a refrigerating machine that is used with those refrigerants is thus demanded to have excellent compatibility with the refrigerants and to be excellent in stability.

RELATED ART DOCUMENTS

Patent Documents

Patent Document 1: JP-T-2006-503961
Patent Document 2: JP-T-7-507342
Patent Document 3: JP-T-2008-524432
Patent Document 4: JP-A-2008-208261
Patent Document 5: JP-A-2009-74018

SUMMARY OF THE INVENTION

Problems to be Solved by the Invention

However, the use of the ordinary antioxidants and acid scavengers or the aforementioned compounds fails to provide such thermal and chemical stability that exceeds the ordinary products, and even though the addition amount is increased, only little advantage is obtained.

Under the circumstances, an object of the present invention is to provide a lubricating oil composition for a refrigerating machine that has a low global warming potential, and that can be particularly preferably used for a refrigerating machine using a refrigerant having a particular structure, such as an unsaturated fluorinated hydrocarbon compound, which is a refrigerant capable of being used for existing car air conditioner system, air conditioners and the like, and that has excellent compatibility with the refrigerant and excellent thermal and chemical stability.

Means for Solving the Problems

As a result of earnest investigations made by the inventors for solving the problems, it has been found that the object can be achieved by including an acid scavenger containing a particular compound in a base oil. The present invention has been completed based on the findings.

The present invention provides:

(1) a lubricating oil composition for a refrigerating machine, containing a base oil, and an organic compound having two or more non-conjugated double bonds in a molecule thereof;

(2) the lubricating oil composition for a refrigerating machine according to the item (1), wherein the organic compound having two or more non-conjugated double bonds in the molecule thereof has a 1,4-diene structure, (3) the lubricating oil composition for a refrigerating machine according to the item (1), wherein the organic compound having two or more non-conjugated double bonds in the molecule thereof has a bridged cyclic structure, (4) the lubricating oil composition for a refrigerating machine according to any one of the items (1) to (3), wherein a mixed amount of the organic compound having two or more non-conjugated double bonds in the molecule thereof is from 0.1 to 10% by mass based on the total amount of the composition, (5) the lubricating oil composition for a refrigerating machine according to any one of the items (1) to (4), wherein a refrigerating machine oil, in which the lubricating oil composition for a refrigerating machine is used, contains as a refrigerant at least one fluorine-containing organic compound selected from compounds represented by the following molecular formula (A), or a combination of the fluorine-containing organic compound and a saturated fluorinated hydrocarbon compound:

$$C_pO_qF_rR_s \quad (A)$$

wherein R represents any one of Cl, Br, I and H; p represents an integer of from 1 to 6; q represents an integer of from 0 to 2; r represents an integer of from 1 to 14; and s represents an integer of from 0 to 13, provided that when q is 0, p is from 2 to 6, and at least one carbon-carbon unsaturated bond is contained in the molecule, (6) the lubricating oil composition for a refrigerating machine according to the item (5), wherein the compound represented by the molecular formula (A) is at least one fluorine-containing organic compound selected from an unsaturated fluorinated hydrocarbon compound, a fluorinated ether compound, a fluorinated alcohol compound and a fluorinated ketone compound, (7) the lubricating oil composition for a refrigerating machine according to the item (6), wherein the unsaturated fluorinated hydrocarbon compound is at least one compound selected from 1,2,3,3,3-pentafluoropropene (HFO1225ye), 1,3,3,3-tetrafluoropropene (HFO1234ze) and 2,3,3,3-tetrafluoropropene (HFO1234yf), (8) the lubricating oil composition for a refrigerating machine according to the item (6), wherein the fluorinated ether compound is a fluorinated dimethyl ether, (9) the lubricating oil composition for a refrigerating machine according to the item (6), wherein the fluorinated alcohol compound is a fluorinated methyl alcohol,

(10) the lubricating oil composition for a refrigerating machine according to the item (6), wherein the fluorinated ketone compound is a fluorinated acetone,

(11) the lubricating oil composition for a refrigerating machine according to any one of the items (5) to (10), wherein the saturated fluorinated hydrocarbon compound is at least one compound selected from difluoromethane, 1,1-difluoroethane, trifluoroethane, tetrafluoroethane and pentafluoroethane,

(12) the lubricating oil composition for a refrigerating machine according to any one of the items (1) to (11), wherein the base oil contains as a major component at least one compound selected from a polyoxyalkylene glycol compound, a polyvinyl ether compound, a copolymer of a poly(oxy)alkylene glycol or a monoether thereof and a polyvinyl ether, a polyol ester compound and a polycarbonate compound,

(13) the lubricating oil composition for a refrigerating machine according to any one of the items (1) to (12), wherein the base oil has a kinematic viscosity at 100° C. of from 1 to 50 mm$^2$/s,

(14) the lubricating oil composition for a refrigerating machine according to any one of the items (1) to (13), wherein the base oil has a number average molecular weight of from 300 to 3,000,

(15) the lubricating oil composition for a refrigerating machine according to any one of the items (1) to (14), wherein the base oil has a viscosity index of 60 or more,

(16) the lubricating oil composition for a refrigerating machine according to any one of the items (1) to (15), wherein the lubricating oil composition further contains at least one additive selected from an extreme pressure agent, an oiliness agent, an antioxidant, an acid scavenger, a metal deactivator and a defoaming agent,

(17) the lubricating oil composition for a refrigerating machine according to any one of the items (1) to (16), wherein the refrigerating machine has a sliding member that contains engineering plastics or has an organic coating film or an inorganic coating film,

(18) the lubricating oil composition for a refrigerating machine according to the item (17), wherein the organic coating film is any one of a polytetrafluoroethylene coating film, a polyimide coating film, a polyamideimide coating film, and a thermosetting insulating film formed with a resin coating composition containing a resin base material containing a polyhydroxy ether resin and a polysulfone resin, and a crosslinking agent,

(19) the lubricating oil composition for a refrigerating machine according to the item (17), wherein the inorganic coating film is any one of a graphite film, a diamond-like carbon film, a tin film, a chromium film, a nickel film and a molybdenum film,

(20) the lubricating oil composition for a refrigerating machine according to anyone of the items (1) to (19), wherein the lubricating oil composition is used for any one of a car air conditioner, an electric car air conditioner, a gas heat pump, an air conditioner, a refrigerator, a hot water supply system for an automatic vending machine or a showcase, and a refrigerating-heating system, and

(21) the lubricating oil composition for a refrigerating machine according to the item (20), wherein a water content in the system is 300 ppm by mass or less, and a residual air partial pressure therein is 10 kPa or less.

Advantages of the Invention

According to the present invention, a lubricating oil composition for a refrigerating machine is provided that has a low global warming potential, and that can be particularly preferably used for a refrigerating machine using a refrigerant having a particular structure, such as an unsaturated fluorinated hydrocarbon, which is a refrigerant capable of being used for existing car air conditioner system and the like, and that has excellent compatibility with the refrigerant and excellent thermal and chemical stability.

EMBODIMENTS FOR CARRYING OUT THE INVENTION

The lubricating oil composition for a refrigerating machine of the present invention contains a base oil, and an organic compound having two or more non-conjugated double bonds in the molecule thereof.

<Organic Compound Having Two or More Non-Conjugated Double Bonds in Molecule Thereof>

In the lubricating oil composition for a refrigerating machine of the present invention, an organic compound having two or more non-conjugated double bonds in the molecule thereof is mixed with a base oil. The non-conjugated double bonds referred herein means a relationship where the double bonds are separated from each other with two or more single bonds. The double bonds may be or may not be contained in an aromatic ring. In the case of a non-conjugated diene, the non-conjugated double bonds therein are counted as two double bonds.

The organic compound having two or more non-conjugated double bonds in the molecule thereof functions as an oxygen scavenger, i.e., has such a function that oxygen existing in a slight amount in a refrigerating machine system is removed through substitution reaction with hydrogen at the $\alpha$-position of the double bond.

The number of the non-conjugated double bonds contained in the molecule is two or more. When the number of the double bond is one, the reactivity with oxygen may be insufficient. The upper limit of the number of the non-conjugated double bonds may be approximately 10.

The organic compound having two or more non-conjugated double bonds in the molecule thereof preferably has a 1,4-diene structure or a bridged cyclic structure.

The 1,4-diene structure herein means a structure that has double bonds at the 1-position and the 4-position, and the bridged cyclic structure means a structure that has at least one ring having a bond (which may have a double bond) dividing the ring.

Examples of the organic compound having a 1,4-diene structure include 1,4-cyclohexadiene, 2-vinyl-1-methylenecyclopropane, 1,3-dimethylenecyclobutane, 4-methylenecyclopentene, 2-methyl-1,4-pentadiene, 1,4-hexadiene, 3-methyl-1,4-pentadiene, 3-methylene-1,4-cyclohexadiene, 1,4-cycloheptadiene, 3-vinyl-1,4-pentadiene, 1,2,6-heptatriene, 4-methylenecyclohexene, 5-methyl-1,4-hexadiene, 2,4-dimethyl-1,4-pentadiene, 1,4-cyclooctadiene, 2,3-dimethyl-1,4-hexadiene, 3-methyl-1,4-heptadiene, 1,4,7-cyclononatriene, 1,3,5-trimethyl-1,4-cyclohexadiene, (Z)-1,4-nonadiene, 1,3,5-tris(methylene)cycloheptane, 3,4-divinyl-1,5-hexadiene, 3-ethyl-1,4-octadiene, 1,4-decadiene, 1,4-undecadiene, 2,4,5,6-pentamethyl-1,4-cyclooctadiene, 7-ethenyl-5-undecene, 2-nonyl-1,4-pentadiene, 4-pentyl-1,4-decadiene, 2-decyl-1,4-pentadiene, 6,9-pentadecadiene, 1,7,10-hexadecatriene, dihydroaplotaxene, 1,8,11-heptadecatriene, 3,6,9-heptadecatriene, 6,9-heptadecadiene, 3,6,9-octadecatriene, 6,9,12-octadecatriene, 6,9-octadecadiene, 3,6,9-nonadecatriene, 2,6-dimethyl-2,6,9-heptadecatriene, 2,2-dimethyl-6-pentyl-3,6-dodecadiene, 2,4,6,8,10,12-hexamethyl-1,12-tridecadiene, 7,11,15-trimethyl-1,4-heptadecadiene and 1,4-p-menthadiene Among these, 1,4-p-menthadiene, 1,4-cyclohexadiene and 1,4-hexadiene are more preferably used due to the high reactivity with oxygen.

Examples of the organic compound having a bridged cyclic structure include 2,5-norbornadiene, norbornadiene, bicyclo[3.2.0]hepta-2,6-diene, homotropilidene, 5-methylenebicyclo[2.2.1]hept-2-ene, bicyclo[2.2.2]octa-2,5-diene, bicyclo[3.2.1]octa-2,6-diene, 5-vinyl-2-norbornene and 5-ethylidene-2-norbornene. Among these, 2,5-norbornadiene is more preferably used due to the high reactivity with oxygen.

Examples of the other organic compounds having two or more non-conjugated double bonds in the molecule thereof include 1,5-hexadiene, 1-methyl-1,4-cyclohexadiene, 3-methylene-1,5-hexadiene, 2-methyl-1,4-hexadiene, 4-methyl-1, 4-hexadiene, 2-methyl-1,5-hexadiene, 3-methyl-1,5-hexadiene, 1,6-heptadiene, 1,5-heptadiene, 4-vinyl-1-cyclohexene, 1,5-cyclooctadiene, 1,4-bismethylenecyclohexane, 1,7-octadiene, 2,5-dimethyl-1,5-hexadiene, 3-ethyl-1,4-hexadiene, 2,6-octadiene, 1,6-octadiene, 1-methyl-2,3-divinylcyclobutane, 1-(1-methylethenyl)-3-cyclohexene, 1-methyl-5-vinyl-1-cyclohexene, 1-methyl-1-ethenyl-3-cyclohexene, 3,5-dimethyl-1,6-heptadiene, 3,3-dimethyl-1,6-heptadiene, 4-methyl-2,6-octadiene, 2,5-dimethyl-1,6-heptadiene, 3,6-dimethyl-1,5-heptadiene, myrcene, cyclodeca-1,6-diene, 1,5-cyclodecadiene, 2,7-dimethyl-2,6-octadiene, 1,5,9-cyclododecatriene, 1,1'-bi[2-cyclohexene], 3-cyclohexyl-1,5-hexadiene, 6-methylene-1,10-undecadiene, 1,5-cyclododecadiene, 6,10-dimethyl-1,5,9-undecatriene, 1,12-tridecadiene, 2,6-dimethyl-1,6-undecadiene, 1,8-cyclotetradecadiene, 8-cyclohexyl-1,5-octadiene, 2,6-dimethyl-10-vinyl-2,6-decadiene, 1,13-tetradecadiene, 3-isopropyl-2,5,7-trimethyl-1,5-octadiene, 4,5-dipropyl-1,7-octadiene, 1,9-cyclohexadecadiene, 1,7-hexadecadiene, 2,4,6,8,10-pentamethyl-1,10-undecadiene, 8,14-heptadecadiene, 1,11-octadecadiene, 9-ethylidene-1,16-heptadecadiene, 1,11-cycloicosadiene, 1,9-icosadiene, icosa-7,13-diene and 4,9-dibutyl-1,1'-dodecadiene.

The mixed amount of the organic compound having two or more non-conjugated double bonds in the molecule thereof is preferably from 0.1 to 10% by mass based on the total amount of the composition. When the mixed amount is in the range, the function as an oxygen scavenger is sufficiently exerted while maintaining the compatibility with the refrigerant.

The mixed amount is more preferably from 0.1 to 5% by mass, and further preferably from 0.1 to 3% by mass.

The lubricating oil composition for a refrigerating machine of the present invention at least contains the organic compound having two or more non-conjugated double bonds in the molecule thereof, and may further contain other oxygen scavenger depending on necessity.

<Base Oil>

The base oil in the present invention preferably contains as a major component at least one compound selected from a polyoxyalkylene glycol compound, a polyvinyl ether compound, a copolymer of a poly(oxy)alkylene glycol or a monoether thereof and a polyvinyl ether, a polyol ester compound, and a polycarbonate compound.

[Polyoxyalkylene Glycol Compound]

Examples of the polyoxyalkylene glycol compound capable of being used as the base oil include compounds represented by the general formula (I):

$$R^1-[(OR^2)_m-OR^3]_n \qquad (I)$$

wherein $R^1$ represents a hydrogen atom, a monovalent hydrocarbon group having from 1 to 10 carbon atoms, an acyl group having from 2 to 10 carbon atoms, a hydrocarbon group having from 1 to 10 carbon atoms and having from 2 to 6 bonding sites or an oxygen-containing hydrocarbon group having from 1 to 10 carbon atoms; $R^2$ represents an alkylene group having from 2 to 4 carbon atoms; $R^3$ represents a hydrogen atom, a hydrocarbon group having from 1 to 10 carbon atoms, an acyl group having from 2 to 10 carbon atoms or an oxygen-containing hydrocarbon group having from 1 to 10 carbon atoms; n represents an integer of from 1 to 6; and m represents a number that provides an average value of m×n of from 6 to 80.

In the general formula (I), the monovalent hydrocarbon group having from 1 to 10 carbon atoms for each of $R^1$ and $R^3$ may be linear, branched or cyclic. The hydrocarbon group is preferably an alkyl group, and specific examples thereof include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group and a cyclohexyl group. When the number of carbon atoms of the alkyl group exceeds 10, the compatibility with the refrigerant may be lowered, which may cause phase separation in some cases. The number of carbon atoms of the alkyl group is preferably from 1 to 6.

The hydrocarbon group moiety of the acyl group having from 2 to 10 carbon atoms for each of $R^1$ and $R^3$ may be linear, branched or cyclic. The hydrocarbon group moiety of the acyl group is preferably an alkyl group, and specific examples thereof include the various groups that have from 1 to 9 carbon atoms described for the aforementioned alkyl group. When the number of carbon atoms of the acyl group exceeds 10, the compatibility with the refrigerant may be lowered, which may cause phase separation in some cases. The number of carbon atoms of the acyl group is preferably from 2 to 6.

In the case where both $R^1$ and $R^3$ are hydrocarbon groups or acyl groups, $R^1$ and $R^3$ may be the same as or different from each other.

In the case where n is 2 or more, plural groups of $R^3$ in one molecule may be the same as or different from each other.

In the case where $R^1$ is a hydrocarbon group having from 1 to 10 carbon atoms and having from 2 to 6 bonding sites, the hydrocarbon group may be a linear one or a cyclic one. The hydrocarbon group having two bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group and cyclohexylene group. Examples of the other hydrocarbon groups include residual groups formed by removing hydroxyl groups from a bisphenol compound, such as bisphenol, bisphenol F and bisphenol A. The hydrocarbon group having from 3 to 6 bonding sites is preferably an aliphatic hydrocarbon group, and examples thereof include residual groups formed by removing hydroxyl groups from a polyhydric alcohol, such as trimethylolpropane, glycerin, pentaerythritol, sorbitol, 1,2,3-trihydroxycyclohexane and 1,3,5-trihydroxycyclohexane.

When the number of carbon atoms of the aliphatic hydrocarbon group exceeds 10, the compatibility with the refrigerant may be lowered, which may cause phase separation in some cases. The number of carbon atoms is preferably from 2 to 6.

Examples of the oxygen-containing hydrocarbon group having from 1 to 10 carbon atoms for each of $R^1$ and $R^3$ include a linear aliphatic group or cyclic aliphatic group having an ether bond, and a tetrahydrofurfuryl group is particularly preferred.

In the present invention, at least one of $R^1$ and $R^3$ is preferably an alkyl group, and particularly an alkyl group having from 1 to 3 carbon atoms, and is especially preferably a methyl group from the standpoint of the viscosity characteristics. Furthermore, both $R^1$ and $R^3$ are preferably alkyl groups, and particularly methyl groups, due to the same factors.

In the general formula (I), $R^2$ represents an alkylene group having from 2 to 4 carbon atoms, and examples of the oxyalkylene group as the repeating unit include an oxyethylene group, an oxypropylene group and an oxybutylene group. The oxyalkylene groups in one molecule may be the same as each other, or two or more kinds of oxyalkylene groups may be contained. At least an oxypropylene unit is preferably contained in one molecule, and an oxypropylene unit is more preferably contained in an amount of 50% by mol or more based on the total oxyalkylene units.

In the general formula (I), n represents an integer of from 1 to 6 and is determined corresponding to the number of bonding sites of $R^1$. For example, when $R^1$ is an alkyl group or an acyl group, n is 1, and when $R^1$ is an aliphatic hydrocarbon group having 2, 3, 4, 5 or 6 bonding sites, n is 2, 3, 4, 5, or 6, respectively. m represents a number that provides an average value of m×n of from 6 to 80. The advantages of the present invention may not be sufficiently provided when the average value of m×n deviates the aforementioned range, for example, the compatibility may be lowered to impair the oil return property when the average value exceeds 80.

The polyoxyalkylene glycol compound represented by the general formula (I) encompasses a polyoxyalkylene glycol having a hydroxyl group at the terminal thereof, and when the content of the hydroxyl group is a ratio of 50% by mol or less based on the total terminal groups, the compound may be favorably used although the hydroxyl group is contained. When the content of the hydroxyl group exceeds 50% by mol, the hygroscopicity is increase, and the viscosity index may be disadvantageously lowered. In the case where the compound is used in combination with the unsaturated fluorinated hydrocarbon refrigerant described above, the refrigerant has an olefin structure and thus is inferior in stability, and thus the base oil preferably has a hydroxyl group value of 5 mgKOH/g or less, more preferably 3 mgKOH/g or less, and particularly preferably 1 mgKOH/g or less.

The compound preferably has an ASTM color of 1 or less and an ash content of 0.1% by mass or less, from the standpoint of the stability of the base oil.

Preferred examples of the polyoxyalkylene glycol compound include a polyoxypropylene glycol dimethyl ether represented by the general formula (I-a):

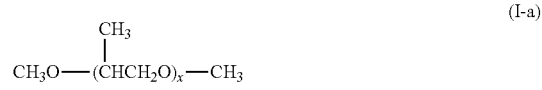

(I-a)

wherein x represents a number of from 6 to 80, a polyoxyethylene polyoxypropylene glycol dimethyl ether represented by the general formula (I-b):

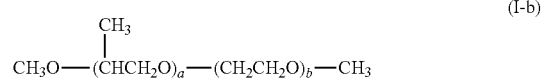

(I-b)

wherein a and b represent numbers that each are 1 or more and provide a sum thereof of from 6 to 80, a polyoxypropylene glycol monobutyl ether represented by the general formula (I-c):

(I-c)

wherein x represents a number of from 6 to 80, and a polyoxypropylene glycol diacetate, from the standpoint of the economy and the advantages.

As the polyoxyalkylene glycol compound represented by the general formula (I), the compounds disclosed in detail in JP-A-2-305893 may be used.

In the present invention, the polyoxyalkylene glycol compound may be used solely or as a combination of two or more kinds thereof.

The polyoxyalkylene glycol derivative may be obtained, for example, in such a manner that an alkylene oxide having from 2 to 4 carbon atoms, such as ethylene oxide and propylene oxide, is polymerized with water or an alkali hydroxide as an initiator to provide a polyoxyalkylene glycol having hydroxyl group on both terminals thereof, and then the hydroxyl groups on both the terminals are etherified or esterified with an alkyl halide or an acyl halide.

The polyoxyalkylene glycol derivative may also be produced in such a manner that an alkylene oxide having from 2 to 4 carbon atoms is polymerized with a monohydric alcohol having from 1 to 10 carbon atoms or an alkali metal salt thereof as an initiator to provide a polyoxyalkylene glycol monoalkyl ether having an ether bond on one terminal and a hydroxyl group on the other terminal, and then the hydroxyl group is etherified or esterified. In the case where a compound represented by the general formula (I) wherein n is 2 or more, a polyhydric alcohol, such as from dihydric to hexahydric, may be used as an initiator instead of the monohydric alcohol.

Upon producing the polyoxyalkylene glycol derivative in these manners, with respect to the ratio of the polyoxyalkylene glycol or the like and the alkyl halide or the acyl halide on the etherifying or esterifying reaction, in the case where the amount of the alkyl halide or the acyl halide is smaller than the stoichiometric amount, the hydroxyl group may remain, and the hydroxyl group value may be increased. Accordingly, the molar ratio of the polyoxyalkylene glycol or the like and the alkyl halide or the acyl halide is preferably optimized. The polymerization, etherifying and esterifying reactions may be performed in an inert gas atmosphere for suppressing coloration.

[Polyvinyl Ether Compound]

In the refrigerating machine oil composition of the present invention, examples of the polyvinyl ether compound capable of being used as the base oil include as a major component a polyvinyl compound having a constitutional unit represented by the general formula (II):

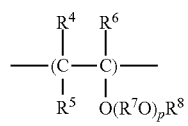

(II)

In the general formula (II), $R^4$, $R^5$ and $R^6$ each represent a hydrogen atom or a hydrocarbon group having from 1 to 8 carbon atoms, and may be the same as or different from each other. Specific examples of the hydrocarbon group herein include an alkyl group, such as a methyl group, an ethyl group, a n-propyl group, an isopropyl group, a n-butyl group, an isobutyl group, a sec-butyl group, a tert-butyl group, various pentyl groups, various hexyl groups, various heptyl groups and various octyl groups; a cycloalkyl group, such as a cyclopentyl group, a cyclohexyl group, various methylcyclohexyl groups, various ethylcyclohexyl groups and various dimethylcyclohexyl groups; an aryl group, such as a phenyl group, various methylphenyl groups, various ethylphenyl groups and various dimethylphenyl groups; and an arylalkyl group, such as a benzyl group, various phenylethyl groups and various methylbenzyl groups. $R^4$, $R^5$ and $R^6$ each preferably represent a hydrogen atom or a hydrocarbon group having 3 or less carbon atoms.

In the general formula (II), $R^7$ represents a divalent hydrocarbon group having from 2 to 10 carbon atoms, and specific examples of the divalent hydrocarbon group having from 2 to 10 carbon atoms include a divalent aliphatic group, such as an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups and various decylene groups; an alicyclic group having two or more bonding sites on the alicyclic hydrocarbon moiety thereof, such as cyclohexane, methylcyclohexane, ethylcyclohexane, dimethylcyclohexane and propylcyclohexane; a divalent aromatic hydrocarbon group, such as various phenylene groups, various methylphenylene groups, various ethyl phenylene groups, various dimethylphenylene groups and various naphthylene groups; an alkylaromatic group containing an alkyl moiety and aromatic moiety each having a monovalent bonding site, in an alkylaromatic hydrocarbon such as toluene and ethylbenzene; and an alkylaromatic group, which is a polyalkylaromatic hydrocarbon containing alkyl moieties having bonding sites, such as xylene and diethylbenzene. Among these, an aliphatic group having from 2 to 4 carbon atoms is particularly preferred. The plural groups of $R^7O$ may be the same as or different from each other.

In the general formula (II), p represents a repeating number, and is a number that provides an average value thereof in a range of from 0 to 10, and preferably from 0 to 5.

In the general formula (II), $R^8$ represents a hydrocarbon group having from 1 to 10 carbon atoms, and specific examples of the hydrocarbon group herein include an alkyl group, such as a methyl group, an ethyl group, a n-propyl group, an isopropyl group, a n-butyl group, an isobutyl group, a sec-butyl group, a tert-butyl group, various pentyl groups, various hexyl groups, various heptyl groups, various octyl groups, various nonyl groups and various decyl groups; a cycloalkyl group, such as a cyclopentyl group, a cyclohexyl group, various methylcyclohexyl groups, various ethylcyclohexyl groups, various propylcyclohexyl groups and various dimethylcyclohexyl groups; an aryl group, such as a phenyl group, various methylphenyl groups, various ethylphenyl groups, various dimethylphenyl groups, various propylphenyl groups, various trimethylphenyl groups, various butylphenyl groups and various naphthyl groups; and an arylalkyl group, such as a benzyl group, various phenylethyl groups, various methylbenzyl groups, various phenylpropyl groups and various phenylbutyl groups. Among these, a hydrocarbon group having 8 or less carbon atoms is preferred, and when p is 0, an alkyl group having 1 to 6 carbon atoms is particularly preferred, and when p is 1 or more, an alkyl group having from 1 to 4 carbon atoms is particularly preferred.

The polyvinyl ether compound of the present invention may be produced by polymerization of a corresponding vinyl ether monomer. The vinyl ether monomer that can be used herein may be a compound represented by the general formula (III):

(III)

wherein $R^4$, $R^5$, $R^6$, $R^7$, $R^8$ and p have the same meanings as above. Examples of the vinyl ether monomer include various compounds that correspond to the aforementioned polyvinyl ether compounds, and specific examples thereof include vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxypropyl ether, vinyl 3,6-dioxaheptyl ether, vinyl 3,6,9-trioxadecyl ether, vinyl 1,4-dimethyl-3,6-dioxaheptyl ether, vinyl 1,4,7-trimethyl-3,6,9-trioxadecyl ether, vinyl 2,6-dioxa-4-heptyl ether, vinyl 2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene and 2-tert-butoxy-2-butene. These vinyl ether monomers may be produced by a known method.

In the polyvinyl ether compound having a constitutional unit represented by the general formula (II) used as a major component of the refrigerating machine oil composition of the present invention, the terminal thereof can be converted to a desired structure by a method disclosed in this embodiment or a known method. Examples of the group to be converted include a saturated hydrocarbon group, an ether group, an alcohol group, a ketone group, an amide group and a nitrile group.

Preferred examples of the polyvinyl ether compound used in the base oil of the refrigerating machine oil composition of the present invention include ones having the following terminal structures:

(1) a compound that has one terminal having a structure represented by the general formula (IV):

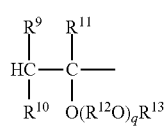

wherein $R^9$, $R^{10}$ and $R^{11}$ each represent a hydrogen atom or a hydrocarbon group having from 1 to 8 carbon atoms, and may be the same as or different from each other; $R^{12}$ represents a divalent hydrocarbon group having from 2 to 10 carbon atoms; $R^{13}$ represents a hydrocarbon group having from 1 to 10 carbon atoms; and q represents a number that provides an average value thereof of from 0 to 10, provided that when there are plural groups represented by $R^{12}O$, the plural groups may be the same as or different from each other, and the other terminal having a structure represented by the general formula (V):

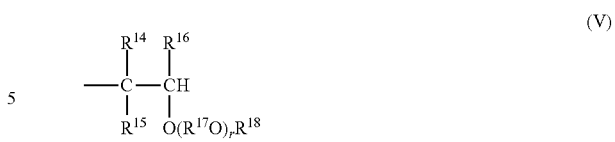

wherein $R^{14}$, $R^{15}$ and $R^{16}$ each represent a hydrogen atom or a hydrocarbon group having from 1 to 8 carbon atoms, and may be the same as or different from each other; $R^{17}$ represents a divalent hydrocarbon group having from 2 to 10 carbon atoms; $R^{18}$ represents a hydrocarbon group having from 1 to 10 carbon atoms; and r represents a number that provides an average value thereof of from 0 to 10, provided that when there are plural groups represented by $R^{17}O$, the plural groups may be the same as or different from each other, (2) a compound that has one terminal having a structure represented by the general formula (IV) and the other terminal having a structure represented by the general formula (VI):

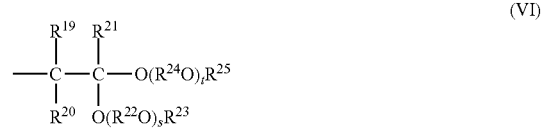

wherein $R^{19}$, $R^{20}$ and $R^{21}$ each represent a hydrogen atom or a hydrocarbon group having from 1 to 8 carbon atoms, and may be the same as or different from each other; $R^{22}$ and $R^{24}$ each represent a divalent hydrocarbon group having from 2 to 10 carbon atoms, and may be the same as or different from each other; $R^{23}$ and $R^{25}$ each represent a hydrocarbon group having from 1 to 10 carbon atoms, and may be the same as or different from each other; and s and t each represent a number that provides an average value thereof of from 0 to 10, provided that when there are plural groups represented by $R^{22}O$, the plural groups may be the same as or different from each other, and when there are plural groups represented by $R^{24}O$, the plural groups may be the same as or different from each other, (3) a compound that has one terminal having a structure represented by the general formula (IV) and the other terminal having an olefinic unsaturated bond, and (4) a compound that has one terminal having a structure represented by the general formula (IV) and the other terminal having a structure represented by the general formula (VII):

wherein $R^{26}$, $R^{27}$ and $R^{28}$ each represent a hydrogen atom or a hydrocarbon group having from 1 to 8 carbon atoms, and may be the same as or different from each other.

The polyvinyl ether mixture may be a mixture of two or more kinds selected from the compounds having the terminal structures (1) to (4). Preferred examples of the mixture include a mixture of the compounds (1) and (4), and a mixture of the compounds (2) and (3).

In the case where the compound is used in combination with the unsaturated fluorinated hydrocarbon refrigerant described above, the refrigerant has an olefin structure and thus is inferior in stability, and thus the base oil preferably has a hydroxyl group value of 17 mgKOH/g or less, more preferably 15 mgKOH/g or less, and particularly preferably 10 mgKOH/g or less.

For the polyvinyl ether compound, the starting materials, the initiator and the reaction conditions are preferably selected to form the polyvinyl ether compound that has a desired viscosity range. A polymer outside the kinematic eddy viscosity range may be controlled to have a viscosity inside the kinematic eddy viscosity range by mixing a polymer having a different kinematic eddy viscosity.

In the present invention, the polyvinyl ether compound may be used solely or as a combination of two or more kinds thereof.

[Copolymer of Poly(oxy)alkylene Glycol or Monoether Thereof and Polyvinyl Ether]

The poly(oxy)alkylene glycol herein means both a polyalkylene glycol and a polyoxyalkylene glycol.

In the refrigerating machine oil composition of the present invention, examples of the copolymer of a poly(oxy)alkylene glycol or a monoether thereof and a polyvinyl ether capable of being used as the base oil include copolymers represented by the general formula (VIII) and the general formula (IX) (which are hereinafter referred to as a polyvinyl ether copolymer I and a polyvinyl ether copolymer II, respectively):

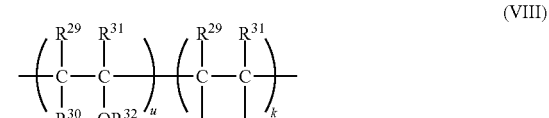

(VIII)

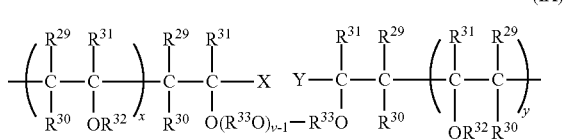

(IX)

In the general formula (VIII), $R^{29}$, $R^{30}$ and $R^{31}$ each represent a hydrogen atom or a hydrocarbon group having from 1 to 8 carbon atoms, and may be the same as or different from each other; $R^{33}$ represents a divalent hydrocarbon group having from 2 to 4 carbon atoms; $R^{34}$ represents an aliphatic or alicyclic hydrocarbon group having from 1 to 20 carbon atoms, an aromatic group, which may have a substituent having from 1 to 20 carbon atoms, an acyl group having from 2 to 20 carbon atoms or an oxygen-containing hydrocarbon group having from 2 to 50 carbon atoms; $R^{32}$ represents a hydrocarbon group having from 1 to 10 carbon atoms, provided that when there are plural groups represented by each of $R^{34}$, $R^{33}$ and $R^{32}$, the plural groups may be the same as or different from each other.

Specific examples of the hydrocarbon group having from 1 to 8 carbon atoms for $R^{29}$ to $R^{31}$ include an alkyl group, such as a methyl group, an ethyl group, a n-propyl group, an isopropyl group, a n-butyl group, an isobutyl group, a sec-butyl group, a tert-butyl group, various pentyl groups, various hexyl groups, various heptyl groups and various octyl groups; a cyclopentyl group, a cyclohexyl group, various methylcyclohexyl groups, various ethylcyclohexyl groups and various dimethylcyclohexyl groups, an aryl group, such as various dimethylphenyl groups; and an arylalkyl group, such as a benzyl group, various phenylethyl groups and various methylbenzyl groups. $R^{29}$, $R^{30}$ and $R^{31}$ each particularly preferably represent a hydrogen atom.

Specific examples of the divalent hydrocarbon group having from 2 to 4 carbon atoms for $R^{33}$ include a divalent alkylene group, such as a methylene group, an ethylene group, a propylene group, a trimethylene group and various butylene groups.

In the general formula (VIII), v represents a repeating number of $R^{33}O$, and is a number that provides an average value in a range of from 1 to 50, preferably from 1 to 20, more preferably from 1 to 10, and particularly preferably from 1 to 5. When there are plural groups represented by $R^{33}O$, the plural groups may be the same as or different from each other.

k represents a number of from 1 to 50, preferably from 1 to 10, more preferably from 1 to 2, and particularly preferably 1, and u represents a number of from 0 to 50, preferably from 2 to 25, and more preferably from 5 to 15, provided that when there are plural numbers for each of k and u, they may show a block form or a random form.

In the general formula (VIII), $R^{34}$ preferably represents an alkyl group having from 1 to 10 carbon atoms, an acyl group having from 2 to 10 carbon atoms or an oxygen-containing hydrocarbon group having from 2 to 50 carbon atoms.

Specific examples of the alkyl group having from 1 to 10 carbon atoms include a methyl group, an ethyl group, a n-propyl group, an isopropyl group, a n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups and various dimethylcyclohexyl groups.

Examples of the acyl group having from 2 to 10 carbon atoms include an acetyl group, a propionyl group, a butyryl group, an isobutyryl group, a valeryl group, an isovaleryl group, a pivaloyl group, a benzoyl group and toluoyl group.

Specific preferred examples of the oxygen-containing hydrocarbon group having from 2 to 50 carbon atoms include a methoxymethyl group, a methoxyethyl group, a methoxypropyl group, a 1,1-bismethoxypropyl group, 1,2-bismethoxypropyl group, an ethoxypropyl group, a (2-methoxyethoxy)propyl group and a (1-methyl-2-methoxy)propyl group.

In the general formula (VIII), specific examples of the hydrocarbon group having from 1 to 10 carbon atoms for $R^{32}$ include an alkyl group, such as a methyl group, an ethyl group, a n-propyl group, an isopropyl group, a n-butyl group, an isobutyl group, various pentyl groups, various hexyl groups, various heptyl groups, various octyl groups, various nonyl groups and various decyl groups; a cycloalkyl group, such as a cyclopentyl group, a cyclohexyl group, various methylcyclohexyl groups, various ethylcyclohexyl groups, various propylcyclohexyl groups and various dimethylcyclohexyl groups; an aryl group, such as a phenyl group, various methylphenyl groups, various ethylphenyl groups, various dimethylphenyl groups, various propyl phenyl groups, various trimethylphenyl groups, various butylphenyl groups and various naphthyl groups; and an arylalkyl group, such as a benzyl group, various phenylethyl groups, various methylbenzyl groups, various phenylpropyl groups and various phenylbutyl groups.

$R^{29}$ to $R^{31}$, $R^{34}$, $R^{33}$, v and $R^{29}$ to $R^{32}$ each may be the same as or different from each other for every constitutional unit.

The polyvinyl ether copolymer I having the constitutional unit represented by the general formula (VIII) enhances the lubricating property, the insulating property, the hygroscopicity and the like while satisfying the compatibility, by the form of copolymer. In this case, the kinds of the monomers as the starting material and the kind of the initiator, and the ratio of the copolymer may be selected, thereby adapting the capabilities of the oil to the target levels. Accordingly, such an oil can be freely provided that is adapted to the demands on the lubricating property, the compatibility and the like, which vary depending on the type of the compressor in the refrigerating system or the air conditioner system, the material of the sliding member, the refrigeration capability, the kind of the refrigerant, and the like.

In the polyvinyl ether copolymer II represented by the general formula (IX), $R^{29}$ to $R^{32}$, $R^{33}$ and v have the same meanings as above. When there are plural groups represented by $R^{33}$ and $R^{32}$, the plural groups may be the same as or different from each other. x and y each represent a number of from 1 to 50, provided that when there are plural numbers for each of x and y, they may show a block form or a random form. X and Y each independently represent a hydrogen atom, a hydroxyl group or a hydrocarbon group having from 1 to 20 carbon atoms.

The production method of the polyvinyl ether copolymer I represented by the general formula (VIII) is not particularly limited and may be any method that can provide the copolymer, and examples thereof include the following production methods 1 to 3.

(Production Method 1 of Polyvinyl Ether Copolymer I)

In the production method 1, by using a poly(oxy)alkylene glycol compound represented by the general formula (X):

$$R^{34}-(OR^{33})_v-OH \quad (X)$$

wherein $R^{33}$, $R^{34}$ and v have the same meanings as above, as an initiator, a vinyl ether compound represented by the general formula (XI):

wherein $R^{29}$ to $R^{32}$ have the same meanings as above, is polymerized, thereby providing the polyvinyl ether copolymer I.

Examples of the poly(oxy)alkylene glycol compound represented by the general formula (X) include an (oxy)alkylene glycol monoether, such as ethylene glycol monomethyl ether, diethylene glycol monomethyl ether, triethylene glycol monomethyl ether, propylene glycol monomethyl ether, dipropylene glycol monomethyl ether and tripropylene glycol monomethyl ether.

Examples of the vinyl ether compound represented by the general formula (XI) include a vinyl ether compound, such as vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether and vinyl n-hexyl ether; a propene compound, such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene and 2-tert-butoxypropene; and a butene compound, such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene and 2-tert-butoxy-2-butene. The vinyl ether monomers can be produced by a known method.

(Production Method 2 of Polyvinyl Ether Copolymer I)

In the production method 2, by using an acetal compound represented by the general formula (XII):

wherein $R^{29}$ to $R^{34}$ and v have the same meanings as above, as an initiator, the vinyl ether compound represented by the general formula (XI) is polymerized, thereby providing the polyvinyl ether copolymer I.

Examples of the acetal compound represented by the general formula (XII) include acetaldehyde methyl (2-methoxyethyl)acetal, acetaldehyde ethyl (2-methoxyethyl)acetal, acetaldehyde methyl (2-methoxy-1-methylethyl)acetal, acetaldehyde ethyl (2-methoxy-1-methylethyl)acetal, acetaldehyde methyl [2-(2-methoxyethyoxy)ethyl]acetal, acetaldehyde ethyl [2-(2-methoxyethyoxy)ethyl]acetal, acetaldehyde methyl [2-(2-methoxyethoxy)-1-methylethyl]acetal and acetaldehyde ethyl [2-(2-methoxyethoxy)-1-methylethyl]acetal.

The acetal compound represented by the general formula (XII) may also be produced, for example, by reacting one molecule of the poly(oxy)alkylene glycol compound represented by the general formula (X) with one molecule of the vinyl ether compound represented by the general formula (XI). The resulting acetal compound may be used as an initiator after isolation or as it is.

(Production Method 3 of Polyvinyl Ether Copolymer I)

In the production method 3, by using an acetal compound represented by the general formula (XIII):

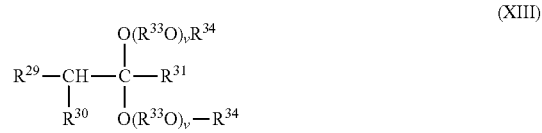

wherein $R^{29}$ to $R^{31}$, $R^{33}$, $R^{34}$ and v have the same meanings as above, as an initiator, the vinyl ether compound represented by the general formula (XI) is polymerized, thereby providing the polyvinyl ether copolymer I.

Examples of the acetal compound represented by the general formula (XIII) include acetaldehyde di(2-methoxyethyl) acetal, acetaldehyde di(2-methoxy-1-methylethyl)acetal, acetaldehyde di[2-(2-methoxyethyoxy)ethyl]acetal and acetaldehyde di[2-(2-methoxyethoxy)-1-methylethyl]acetal.

The acetal compound represented by the general formula (XIII) may also be produced, for example, by reacting one molecule of the poly(oxy)alkylene glycol compound represented by the general formula (X) with one molecule of a vinyl ether compound represented by the general formula (XIV):

(XIV)

wherein $R^{29}$ to $R^{31}$, $R^{33}$, $R^{34}$ and v have the same meanings as above. The resulting acetal compound may be used as an initiator after isolation or as it is.

The vinyl ether copolymer I represented by the general formula (VIII) may be such a polyvinyl ether copolymer I that has one terminal having a structure represented by the general formula (XV) or (XVI):

(XV)

(XVI)

wherein $R^{29}$ to $R^{34}$ and v have the same meanings as above, and the other terminal having a structure represented by the general formula (XVII) or (XVIII):

(XVII)

(XVIII)

wherein $R^{29}$ to $R^{34}$ and v have the same meanings as above.

Particularly preferred examples of the polyvinyl ether copolymer I as the base oil of the refrigerating machine oil composition of the present invention include the following:

(1) a copolymer having a structure that has one terminal represented by the general formula (XV) or (XVI) and the other terminal represented by the general formula (XVII) or (XVIII), wherein in the general formula (VIII), $R^{29}$, $R^{30}$ and $R^{31}$ each represent a hydrogen atom, v represents a number of from 1 to 4, $R^{33}$ represents a divalent hydrocarbon group having from 2 to 4 carbon atoms, $R^{34}$ represents an alkyl group having from 1 to 10 carbon atoms, and $R^{32}$ represents a hydrocarbon group having from 1 to 10 carbon atoms, (2) a copolymer having a structure that has one terminal represented by the general formula (XV) and the other terminal represented by the general formula (XVIII), wherein in the general formula (VIII), $R^{29}$, $R^{30}$ and $R^{31}$ each represent a hydrogen atom, v represents a number of from 1 to 4, $R^{33}$ represents a divalent hydrocarbon group having from 2 to 4 carbon atoms, $R^{34}$ represents an alkyl group having from 1 to 10 carbon atoms, and $R^{32}$ represents a hydrocarbon group having from 1 to 10 carbon atoms, and (3) a copolymer having a structure that has one terminal represented by the general formula (XVI) and the other terminal represented by the general formula (XVII), wherein in the general formula (VIII), $R^{29}$, $R^{30}$ and $R^{31}$ each represent a hydrogen atom, v represents a number of from 1 to 4, $R^{33}$ represents a divalent hydrocarbon group having from 2 to 4 carbon atoms, $R^{34}$ represents an alkyl group having from 1 to 10 carbon atoms, and $R^{32}$ represents a hydrocarbon group having from 1 to 10 carbon atoms.

The production method of the polyvinyl ether copolymer II represented by the general formula (IX) is not particularly limited and may be any method that can provide the copolymer, and the copolymer may be produced efficiently by the method described below.

(Production Method of Polyvinyl Ether Copolymer II)

By using a poly(oxy)alkylene glycol represented by the general formula (XIX):

(XIX)

wherein $R^{33}$ and v have the same meanings as above, as an initiator, the vinyl ether compound represented by the general formula (XI) is polymerized, thereby providing the polyvinyl ether copolymer II represented by the general formula (IX).

Examples of the poly(oxy)alkylene glycol represented by the general formula (XIX) include ethylene glycol, diethylene glycol, triethylene glycol, polyethylene glycol, propylene glycol, dipropylene glycol and polypropylene glycol.

In the case where the copolymer is used in combination with the unsaturated fluorinated hydrocarbon refrigerant described above, the refrigerant has an olefin structure and thus is inferior in stability, and thus the base oil preferably has a hydroxyl group value of 15 mgKOH/g or less.

In the present invention, the copolymer of a poly(oxy)alkylene glycol or a monoether thereof and a polyvinyl ether may be used solely or as a combination of two or more kinds thereof.

[Polyol Ester Compound]

In the refrigerating machine oil composition of the present invention, preferred examples of the polyol ester compound capable of being used as the base oil include an ester of a diol or a polyol having approximately from 3 to 20 hydroxyl groups and a fatty acid having approximately from 1 to 24 carbon atoms.

Examples of the diol herein include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol and 1,12-dodecanediol.

Examples of the polyol include a polyhydric alcohol, such as trimethylolethane, trimethylolpropane, trimethylolbutane, di(trimethylolpropane), tri(trimethylolpropane), pentaerythritol, di(pentaerythritol), tri(pentaerythritol), glycerin, polyglycerin (dimer to eicosamer of glycerin), 1,3,5-pentanetriol, sorbitol, sorbitan, a sorbitol-glycerin condensate, adonitol, arabitol, xylitol and mannitol; a saccharide, such as xylose, arabinose, ribose, rhamnose, glucose, fructose, galactose, mannose, sorbose, cellobiose, maltose, isomaltose, trehalose, sucrose, raffinose, gentianose and melezitose; and partially etherified products and methyl glucosides thereof. Among these, a hindered alcohol, such as neopentyl glycol, trimethylolethane, trimethylolpropane, trimethylolbutane, di(trimethylolpropane), tri(trimethylolpropane), pentaerythritol, di(pentaerythritol) and tri(pentaerythritol), is preferred as the polyol.

The carbon number of the fatty acid is not particularly limited, and in general, a fatty acid having from 1 to 24 carbon atoms may be used. In the fatty acid having from 1 to 24 carbon atoms, a fatty acid having 3 or more carbon atoms is preferred, a fatty acid having 4 or more carbon atoms is more preferred, a fatty acid having 5 or more carbon atoms is further preferred, and a fatty acid having 10 or more carbon atoms is most preferred, from the standpoint of the lubricating property. A fatty acid having 18 or less carbon atoms is preferred, a fatty acid having 12 or less carbon atoms is more preferred, and a fatty acid having 9 or less carbon atoms is further preferred, from the standpoint of the compatibility with the refrigerant.

The fatty acid may be any of a linear fatty acid and a branched fatty acid, and the fatty acid is preferably a linear fatty acid from the standpoint of the lubricating property, and is preferably a branched fatty acid from the standpoint of the hydrolysis stability. The fatty acid may be any of a saturated fatty acid and an unsaturated fatty acid.

Specific examples of the fatty acid include linear and branched fatty acids of pentanoic acids, hexanoic acids, heptanoic acids, octanoic acids, nonanoic acids, decanoic acids, undecanoic acids, dodecanoic acids, tridecanoic acids, tetradecanoic acids, pentadecanoic acids, hexadecanoic acids, heptadecanoic acids, octadecanoic acids, nonadecanoic acids, icosanoic acids, oleic acids and the like; and a so-called neo acid having a quaternary α-carbon atom. More specifically, preferred examples thereof include valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid and 3,5,5-trimethylhexanoic acid.

The polyol ester may be a partial ester, in which all the hydroxyl groups of the polyol are not fully esterified, a full ester, in which all the hydroxyl groups are esterified, or a mixture of a partial ester and a full ester, and is preferably a full ester.

In the polyol ester, an ester of a hindered alcohol, such as neopentyl glycol, trimethylolethane, trimethylolpropane, trimethylolbutane, di(trimethylolpropane), tri(trimethylolpropane), pentaerythritol, di(pentaerythritol) and tri(pentaerythritol), is more preferred, and an ester of neopentyl glycol, trimethylolethane, trimethylolpropane, trimethylolbutane or pentaerythritol is further preferred, due to the excellent hydrolysis stability, and an ester of pentaerythritol is most preferred since it is excellent in compatibility with the refrigerant and hydrolysis stability.

Preferred specific examples of the polyol ester include diesters of neopentyl glycol with one kind or two or more kinds selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid and 3,5,5-trimethylhexanoic acid; triesters of trimethylolethane with one kind or two or more kinds selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid and 3,5,5-trimethylhexanoic acid; triesters of trimethylolpropane with one kind or two or more kinds selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid and 3,5,5-trimethylhexanoic acid; triesters of trimethylolbutane with one kind or two or more kinds selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid and 3,5,5-trimethylhexanoic acid; and tetraesters of pentaerythritol with one kind or two or more kinds selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid and 3,5,5-trimethylhexanoic acid.

The ester with two or more kinds of fatty acids may be a mixture of esters with one kind of fatty acid and a polyol, and an ester with a mixed fatty acids of two or more kinds thereof and a polyol, particularly an ester with a mixed fatty acid and a polyol, is excellent in low temperature characteristics and compatibility with the refrigerant.

In the case where the compound is used in combination with the unsaturated fluorinated hydrocarbon refrigerant described above, the refrigerant has an olefin structure and thus is inferior in stability, and thus the base oil preferably has an acid value of 0.02 mgKOH/g or less and a hydroxyl group value of 5 mgKOH/g or less. The acid value is more preferably 0.01 mgKOH/g or less, and the hydroxyl group value is more preferably 3 mgKOH/g or less.

The base oil preferably has an ASTM color of 1 or less, a surface tension of 20 mN/m or more, an extracted water pH of 5.5 or more, an ash content of 0.1% by mass or less, and a volume resistance of $10^9$ Ωcm or more. The base oil having these properties has good stability and excellent electric insulation, and thus is preferred.

Upon producing the polyol ester compound, the esterifying reaction may be performed in an inert gas atmosphere for suppressing coloration. Furthermore, with respect to the ratio of the polyhydric alcohol and the aliphatic monocarboxylic acid to be reacted with each other, in the case where the amount of the aliphatic monocarboxylic acid is smaller than the stoichiometric amount, the hydroxyl group may remain, and the hydroxyl group value may be increased, and on the other hand, in the case where the amount of the aliphatic monocarboxylic acid is larger than the stoichiometric amount, the carboxylic acid may remain, the acid value may be increased, and the extracted water pH may be lowered. Accordingly, the molar ratio of the polyhydric alcohol and the aliphatic monocarboxylic acid is preferably optimized, and the process is preferably controlled in such a manner that the amount of the remaining esterification catalyst (ash content) is made as small as possible.

[Polycarbonate Compound]

In the refrigerating machine oil composition of the present invention, preferred examples of the polycarbonate compound capable of being used as the base oil include a polycarbonate having two or more polycarbonate bonds in one molecule, i.e., at least one kind selected from a compound represented by the general formula (XX):

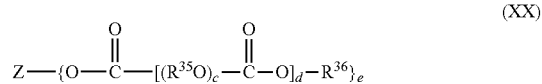

(XX)

wherein Z represents a residual group formed by removing a hydroxyl group from an e-hydric alcohol having from 1 to 12 carbon atoms; $R^{35}$ represents a linear or branched alkylene group having from 2 to 10 carbon atoms; $R^{36}$ represents a monovalent hydrocarbon group having from 1 to 12 carbon atoms or a group containing an ether bond represented by $R^{38}(O-R^{37})_f$— (wherein $R^{38}$ represents a hydrogen atom or a monovalent hydrocarbon group having from 1 to 12 carbon atoms; $R^{37}$ represents a linear or branched alkylene group having from 2 to 10 carbon atoms; and f represents an integer of from 1 to 20); c represents an integer of from 1 to 30; d represents an integer of from 1 to 50; and e represents an integer of from 1 to 6, and a compound represented by the general formula (XXI):

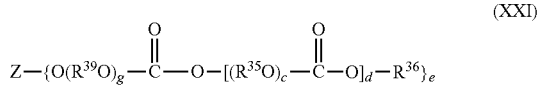

(XXI)

wherein $R^{39}$ represents a linear or branched alkylene group having from 2 to 10 carbon atoms; g represents an integer of from 1 to 20; and Z, $R^{35}$, $R^{36}$, c, d and e have the same meanings as above.

In the general formulae (XX) and (XXI), Z represents a residual group formed by removing a hydroxyl group from a monohydric to hexahydric alcohol having from 1 to 12 carbon atoms, and particularly preferably a residual group formed by removing a hydroxyl group from a monohydric alcohol having from 1 to 12 carbon atoms.

Examples of the monohydric to hexahydric alcohol having from 1 to 12 carbon atoms forming the residual group represented by Z include, as a monohydric alcohol, an aliphatic monohydric alcohol, such as methyl alcohol, ethyl alcohol, n-propyl or isopropyl alcohol, various butyl alcohols, various pentyl alcohols, various hexyl alcohols, various octyl alcohols, various decyl alcohols and various dodecyl alcohols; an alicyclic monohydric alcohol, such as cyclopentyl alcohol and cyclohexyl alcohol; an aromatic alcohol, such as phenol, cresol, xylenol, butylphenol and naphthol; and an aromatic aliphatic alcohol, such as benzyl alcohol and phenethyl alcohol, as a dihydric alcohol, an aliphatic alcohol, such as ethylene glycol, propylene glycol, butylene glycol, neopentylene glycol and tetramethylene glycol; an alicyclic alcohol, such as cyclohexanediol and cyclohexanedimethanol; and an aromatic alcohol, such as catechol, resorcinol, hydroquinone and dihydroxydiphenyl, as a trihydric alcohol, an aliphatic alcohol, such as glycerin, trimethylolpropane, trimethylolethane, trimethylolbutane and 1,3,5-pentanetriol; an alicyclic alcohol, such as cyclohexanetriol and cyclohexanetrimethanol; and an aromatic alcohol, such as pyrogallol and methylpyrogallol, and as a tetrahydric to hexahydric alcohol, an aliphatic alcohol, such as pentaerythritol, diglycerin, triglycerin, sorbitol and dipentaerythritol.

Examples of the polycarbonate compound include, as the compound represented by the general formula (XX), a compound represented by the general formula (XX-a):

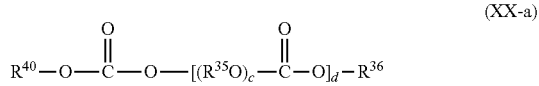

(XX-a)

wherein $R^{40}$ represents a residual group formed by removing a hydroxyl group from a monovalent alcohol having from 1 to 12 carbon atoms; and $R^{35}$, $R^{36}$, c and d have the same meanings as above, and/or as the compound represented by the general formula (XXI), a compound represented by the general formula (XXI-a):

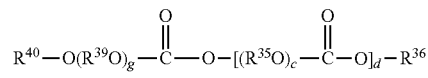

(XXI-a)

wherein $R^{35}$, $R^{36}$, $R^{39}$, $R^{40}$, c, d and g have the same meanings as above.

In the general formulae (XX-a) and (XXI-a), examples of the residual group formed by removing a hydroxyl group from a monovalent alcohol having from 1 to 12 carbon atoms, which is represented by $R^{40}$, include an aliphatic hydrocarbon group, such as a methyl group, an ethyl group, a n-propyl group, an isopropyl group, various butyl groups, various pentyl groups, various hexyl groups, various octyl groups, various decyl groups and various dodecyl groups; an alicyclic hydrocarbon group, such as a cyclopentyl group, a cyclohexyl group, a methylcyclohexyl group, a dimethylcyclohexyl group and a decahydronaphthyl group; an aromatic hydrocarbon group, such as a phenyl group, various tolyl groups, various xylyl groups, a mesityl group and various naphthyl groups; and an aromatic aliphatic hydrocarbon group, such as a benzyl group, a methylbenzyl group, a phenethyl group and various naphthylmethyl groups. Among these, a linear or branched alkyl group having from 1 to 6 carbon atoms is preferred.

$R^{35}$ represents a linear or branched alkylene group having from 2 to 10 carbon atoms, and in the group, a group having from 2 to 6 carbon atoms is preferred, and an ethylene group and a propylene group are particularly preferred, from the standpoint of the capability and the easiness of production. $R^{36}$ represents a monovalent hydrocarbon group having from 1 to 12 carbon atoms or a group containing an ether bond represented by $R^{38}$—(O—$R^{37}$)$_f$— (wherein $R^{38}$ represents a hydrogen atom or a monovalent hydrocarbon group having from 1 to 12 carbon atoms, and preferably a monovalent hydrocarbon group having from 1 to 6 carbon atoms; $R^{37}$ represents a linear or branched alkylene group having from 2 to 10 carbon atoms; and f represents an integer of from 1 to 20), and examples of the monovalent hydrocarbon group having from 1 to 12 carbon atoms include those exemplified for $R^{40}$. As the linear or branched alkylene group having from 2 to 10 carbon atoms represented by $R^{37}$, a group having from 2 to 6 carbon atoms is preferred, and an ethylene group and a propylene group are particularly preferred, due to the same reasons as in $R^{35}$.

$R^{36}$ is particularly preferably a linear or branched alkyl group having from 1 to 6 carbon atoms.

In the general formula (XXI-a), as the linear or branched alkylene group having from 2 to 10 carbon atoms represented by $R^{39}$, a group having from 2 to 6 carbon atoms is preferred, and an ethylene group and a propylene group are particularly preferred, due to the same reasons as in $R^{35}$.

The polycarbonate compound may be produced by various methods, and in general, a carbonate ester-forming derivative, such as a carbonate diester or phosgene, and an alkylene glycol or a polyoxyalkylene glycol may be reacted with each other according to a known method, thereby producing the target polycarbonate compound.

In the present invention, the polycarbonate compound may be used solely or as a combination of two or more kinds thereof.

In the refrigerating machine oil composition of the present invention, the base oil used contains as a major component at least one oxygen-containing compound selected from the polyoxyalkylene glycol compound, the polyvinyl ether compound, the copolymer of a poly(oxy)alkylene glycol or a monoether thereof and a polyvinyl ether, the polyol ester compound and the polycarbonate compound. The language "contain as a major component" herein means that the oxygen-containing compound is contained at a ratio of 50% by mass or more. The content of the oxygen-containing compound in the base oil is preferably 70% by mass or more, more preferably 90% by mass or more, and further preferably 100% by mass.

In the present invention, the base oil preferably has a kinematic viscosity at 100° C. of from 1 to 50 mm$^2$/s, more preferably from 3 to 40 mm$^2$/s, and further preferably from 4 to 30 mm$^2$/s. When the kinematic viscosity is 1 mm$^2$/s or more, a good lubricating capability (load bearing property) is exerted, and good sealing property is obtained, and when it is 50 mm$^2$/s or less, good energy saving property is obtained.

The base oil preferably has a number average molecular weight of from 300 to 3,000, more preferably from 500 to 3,000, and further preferably from 700 to 2,500. The base oil preferably has an ignition point of 150° C. or less, and when the number average molecular weight of the base oil is from 300 to 3,000, the desired capability as a refrigerating machine oil can be exerted, and the ignition point of the base oil can be controlled within the aforementioned range.

In the present invention, the base oil preferably has a viscosity index of 60 or more, and more preferably 80 or more. The upper limit of the viscosity index may be approximately 300 due to the restriction on production or the like.

When the viscosity index is 60 or more, decrease in the kinematic viscosity can be suppressed at a high temperature.

The viscosity index of the base oil may be measured according to JIS K 2283.

In the present invention, the base oil may contain, in addition to the oxygen-containing compound, other base oil in an amount of 50% by mass or less, preferably 30% by mass or less, and more preferably 10% by mass or less, unless the base oil deviates from the aforementioned properties, but the base oil preferably contains no other base oil.

Examples of the base oil that is capable of being used with the oxygen-containing compound include other polyester compound, a hydrogenated product of an α-olefin oligomer, a mineral oil, an alicyclic hydrocarbon compound and an alkylated aromatic hydrocarbon compound.

<Refrigerant>

Examples of the refrigerant, to which the lubricating oil composition for a refrigerating machine of the present invention is applied, include a saturated fluorinated hydrocarbon compound (HFC), carbon dioxide ($CO_2$), a low boiling point hydrocarbon (HC) and ammonia, and a refrigerant containing at least one fluorine-containing organic compound selected from compounds represented by the following molecular formula (A), or a combination of the fluorine-containing organic compound and a saturated fluorinated hydrocarbon compound is preferred since it has a low global warming potential:

$$C_pO_qF_rR_s \qquad (A)$$

wherein R represents any one of Cl, Br, I and H; p represents an integer of from 1 to 6; q represents an integer of from 0 to 2; r represents an integer of from 1 to 14; and s represents an integer of from 0 to 13, provided that when q is 0, p is from 2 to 6, and at least one carbon-carbon unsaturated bond is contained in the molecule.

The refrigerant represented by the molecular formula (A) will be described in detail below.

The molecular formula (A) shows the kinds and the numbers of the elements in the molecule, and the formula (A) shows a fluorine-containing organic compound having a number of carbon atoms p of from 1 to 6. A fluorine-containing compound having from 1 to 6 carbon atoms may have physical and chemical characteristics including a boiling point, a freezing point, an evaporation latent heat and the like that are demanded for a refrigerant.

In the molecular formula (A), the bonding mode of the p carbon atoms represented by $C_p$ includes a carbon-carbon single bond, an unsaturated bond, such as a carbon-carbon double bond, a carbon-oxygen double bond and the like. The carbon-carbon unsaturated bond is preferably a carbon-carbon double bond from the standpoint of the stability, and the number thereof may be 1 or more, and preferably 1.

In the molecular formula (A), the bonding mode of the q oxygen atoms represented by $O_q$ is preferably oxygen derived from an ether group, a hydroxyl group or a carbonyl group. The number of the oxygen atoms q may be 2, which includes the case where two groups of an ether group, a hydroxyl group and the like are contained.

In the case where the number q is 0 in $O_q$, i.e., no oxygen atom is contained in the molecule, p is from 2 to 6, and at least one unsaturated bond, such as a carbon-carbon double bond, is contained in the molecule. In other words, at least one of the bonding modes of the p carbon atoms represented by $C_p$ is necessarily a carbon-carbon unsaturated bond.

In the molecular formula (A), R represents any one of Cl, Br, I and H, and R is preferably H due to less potential of the ozone layer destruction.

As described above, preferred examples of the fluorine-containing organic compound represented by the molecular formula (A) include an unsaturated fluorinated hydrocarbon compound, a fluorinated ether compound, a fluorinated alcohol compound and a fluorinated ketone compound.

These compounds will be described below.

[Unsaturated Fluorinated Hydrocarbon Compound]

Examples of the unsaturated fluorinated hydrocarbon compound used as the refrigerant of the refrigerating machine in the present invention include an unsaturated fluorinated hydrocarbon compound represented by the molecular formula (A), wherein R represents H, p represents an integer of from 2 to 6, q represents an integer of 0, r represents an integer of from 1 to 12, and s represents an integer of from 0 to 11.

Preferred examples of the unsaturated fluorinated hydrocarbon compound include fluorinated products of a linear or branched chain-like olefin having from 2 to 6 carbon atoms and a cyclic olefin having from 4 to 6 carbon atoms.

Specific examples thereof include ethylene having from 1 to 3 fluorine atoms introduced, propene having from 1 to 5 fluorine atoms introduced, a butene compound having from 1 to 7 fluorine atoms introduced, a pentene compound having from 1 to 9 fluorine atoms introduced, a hexene compound having from 1 to 11 fluorine atoms introduced, cyclobutene having from 1 to 5 fluorine atoms introduced, cyclopentene having from 1 to 7 fluorine atoms introduced and cyclohexene having from 1 to 9 fluorine atoms introduced.

Among the unsaturated fluorinated hydrocarbon compounds, an unsaturated fluorinated hydrocarbon compound having from 2 to 3 carbon atoms is preferred, examples of which include a fluorinated product of ethylene, such as trifluoroethylene, and a fluorinated product of various propene compounds, and a fluorinated product of propene is more preferred. Examples of the fluorinated product of propene include 3,3,3-trifluoropropene, 1,3,3,3-tetrafluoropropene and 2,3,3,3-tetrafluoropropene, and 1,2,3,3,3-pentafluoropropene (HFO1225ye), 1,3,3,3-tetrafluoropropene (HFO1234ze) and 2,3,3,3-tetrafluoropropene (HFO1234yf) are particularly preferred due to the low global warming potential thereof.

In the present invention, the unsaturated fluorinated hydrocarbon compound may be used solely or as a combination of two or more kinds thereof.

[Fluorinated Ether Compound]

Examples of the fluorinated ether compound used as the refrigerant of the refrigerating machine in the present invention include a fluorinated ether compound represented by the molecular formula (A), wherein R represents H, p represents an integer of from 2 to 6, q represents an integer of from 1 to 2, r represents an integer of from 1 to 14, and s represents an integer of from 0 to 13.

Preferred examples of the fluorinated ether compound include a fluorinated product of a chain-like aliphatic ether with a linear or branched alkyl group having from 2 to 6 carbon atoms and from 1 to 2 ether bonds, and a fluorinated product of an alicyclic ether having from 3 to 6 carbon atoms and from 1 to 2 ether bonds.

Specific examples thereof include fluorinated dimethyl ether having from 1 to 6 fluorine atoms introduced, fluorinated methyl ethyl ether having from 1 to 8 fluorine atoms introduced, fluorinated dimethoxymethane having from 1 to 8 fluorine atoms introduced, a fluorinated methyl propyl ether compound having from 1 to 10 fluorine atoms introduced, a fluorinated methyl butyl ether compound having from 1 to 12 fluorine atoms introduced, a fluorinated ethyl propyl ether compound having from 1 to 12 fluorine atoms introduced, fluorinated oxetane having from 1 to 6 fluorine atoms introduced, fluorinated 1,3-dioxolane having from 1 to 6 fluorine atoms introduced and fluorinated tetrahydrofuran having from 1 to 8 fluorine atoms introduced.

Examples of the fluorinated ether compound include hexafluorodimethyl ether, pentafluorodimethyl ether, bis(difluoromethyl)ether, fluoromethyl trifluoromethyl ether, trifluoromethyl methyl ether, perfluorodimethoxymethane, 1-trifluoromethoxy-1,1,2,2-tetrafluoroethane, difluoromethoxypentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, and various isomers of tetrafluorooxetane.

In the present invention, the fluorinated ether compound may be used solely or as a combination of two or more kinds thereof.

[Fluorinated Alcohol Compound]

Examples of the fluorinated alcohol compound used as the refrigerant of the refrigerating machine in the present invention include a fluorinated ether compound represented by the molecular formula (A), wherein R represents H, p represents an integer of from 1 to 6, q represents an integer of from 1 to 2, r represents an integer of from 1 to 13, and s represents an integer of from 1 to 13.

Preferred examples of the fluorinated alcohol compound include a fluorinated product of a linear or branched aliphatic alcohol having from 1 to 6 carbon atoms and from 1 to 2 hydroxyl groups.

Specific examples thereof include fluorinated methyl alcohol having from 1 to 3 fluorine atoms introduced, fluorinated ethyl alcohol having from 1 to 5 fluorine atoms introduced, a fluorinated propyl alcohol compound having from 1 to 7 fluorine atoms introduced, a fluorinated butyl alcohol compound having from 1 to 9 fluorine atoms introduced, a fluorinated pentyl alcohol compound having from 1 to 11 fluorine atoms introduced, fluorinated ethylene glycol having from 1 to 4 fluorine atoms introduced and fluorinated propylene glycol having from 1 to 6 fluorine atoms introduced.

Examples of the fluorinated alcohol compound include a fluorinated alcohol, such as monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol and various isomers of octafluorobutyl alcohol; nonafluorobutyl alcohol, various isomers of difluoroethylene glycol, trifluoroethylene glycol, tetrafluoroethylene glycol; a fluorinated propylene glycol, such as various isomers of difluoropropylene glycol, various isomers of trifluoropropylene glycol, various isomers of tetrafluoropropylene glycol, various isomers of pentafluoropropylene glycol and hexafluoropropylene glycol; and a fluorinated trimethylene glycol corresponding to the fluorinated propylene glycol.

In the present invention, the fluorinated alcohol compound may be used solely or as a combination of two or more kinds thereof.

[Fluorinated Ketone Compound]

Examples of the fluorinated ketone compound used as the refrigerant of the refrigerating machine in the present invention include a fluorinated ketone compound represented by the molecular formula (A), wherein R represents H, p represents an integer of from 2 to 6, q represents an integer of from 1 to 2, r represents an integer of from 1 to 12, and represents an integer of from 0 to 11.

Preferred examples of the fluorinated ketone compound include a fluorinated product of aliphatic ketone having from 3 to 6 carbon atoms and a linear or branched alkyl group.

Specific examples thereof include fluorinated acetone having from 1 to 6 fluorine atoms introduced, fluorinated methyl ethyl ketone having from 1 to 8 fluorine atoms introduced, fluorinated diethyl ketone having from 1 to 10 fluorine atoms introduced and fluorinated methyl propyl ketone having from 1 to 10 fluorine atoms introduced.

Examples of the fluorinated ketone compound include hexafluorodimethyl ketone, pentafluorodimethyl ketone, bis(difluoromethyl)ketone, fluoromethyl trifluoromethyl ketone, trifluoromethyl methyl ketone, perfluoromethyl ethyl ketone, trifluoromethyl 1,1,2,2-tetrafluoroethyl ketone, difluoromethyl pentafluoroethyl ketone, trifluoromethyl 1,1,2,2-tetrafluoroethyl ketone, difluoromethyl 1,1,2,2-tetrafluoroethyl ketone, difluoromethyl 1,2,2,2-tetrafluoroethyl ketone, trifluoromethyl 2,2,2-trifluoroethyl ketone and difluoromethyl 2,2,2-trifluoroethyl ketone.

In the present invention, the fluorinated ketone compound may be used solely or as a combination of two or more kinds thereof.

[Saturated Fluorinated Hydrocarbon Compound]

The saturated fluorinated hydrocarbon compound is such a refrigerant that is capable of being mixed depending on necessity with the at least one fluorinated organic compound selected from the compound represented by the molecular formula (A).

The saturated fluorinated hydrocarbon compound is preferably a fluorinated product of an alkane having from 1 to 4 carbon atoms, and particularly preferably a fluorinated product of methane or ethane having 1 or 2 carbon atoms, such as trifluoromethane, difluoromethane, 1,1-difluoroethane, 1,1, 1-trifluoroethane, 1,1,2-trifluoroethane, 1,1,1,2-tetrafluoroethane, 1,1,2,2-tetrafluoroethane and 1,1,1,2,2-pentafluoroethane. The saturated fluorinated hydrocarbon compound may also be compounds formed by halogenating the aforementioned fluorinated products of an alkane with a halogen atom other than fluorine, and examples thereof include trifluoroiodomethane ($CF_3I$). The saturated fluorinated hydrocarbon compound may be used solely or as a combination of two or more kinds thereof.

In the present invention, a combination of a saturated fluorinated hydrocarbon compound having from 1 to 3 carbon atoms and the aforementioned unsaturated fluorinated hydrocarbon compound having from 2 to 3 carbon atoms is particularly preferably used.

Examples of the saturated fluorinated hydrocarbon compound having from 1 to 3 carbon atoms include R32, R125, R134a, R143b, R152a and R245fa, and among these, R32, R134a and R152a are preferred. The saturated fluorinated hydrocarbon compound may be used solely or as a combination of two or more kinds thereof.

Examples of the combination of the saturated fluorinated hydrocarbon compound having from 1 to 3 carbon atoms and the unsaturated fluorinated hydrocarbon compound having from 2 to 3 carbon atoms include a combination of $CH_2F_2$ (HFC32) with HFO1225ye, HFO1234yf or HFO1234ze, a combination of $CHF_2CH_3$ (HFC152a) with HFO1225ye, HFO1234yf or HFO1234ze, and a combination of $CF_3I$ with HFO1234yf.

The mixed amount of the saturated fluorinated hydrocarbon compound is generally 10% by mass or more, preferably 20% by mass or more, and more preferably 30% by mass or more, based on the total amount of the refrigerant.

The refrigerant in the present invention may further be mixed depending on necessity with carbon dioxide ($CO_2$), a low boiling point hydrocarbon (HC), ammonia and the like in the at least one fluorine-containing organic compound selected from the compound represented by the molecular formula (A).

The mixed amount of carbon dioxide and the like mentioned above is generally 10% by mass or more, preferably 20% by mass or more, and more preferably 30% by mass or more, based on the total amount of the refrigerant.

[Other Additives]

The refrigerating machine oil composition of the present invention may contain at least one member selected from an extreme pressure agent, an oiliness agent, an antioxidant, an acid scavenger, a metal deactivator, a defoaming agent and the like.

(Extreme Pressure Agent)

Examples of the extreme pressure agent include a phosphorus extreme pressure agent, such as a phosphate ester, an acidic phosphate ester, a phosphite ester, an acidic phosphite ester, and amine salts thereof.

In the phosphorus extreme pressure agent, tricresyl phosphate, trithiophenyl phosphate, tri(nonylphenyl)phosphite, dioleyl hydrogen phosphite, 2-ethylhexyldiphenyl phosphite and the like are particularly preferred from the standpoint of extreme pressure property, friction property and the like.

Examples of the extreme pressure agent also include a metal salt of a carboxylic acid. The metal salt of a carboxylic acid herein is preferably a metal salt of a carboxylic acid having from 3 to 60 carbon atoms, and more preferably a metal salt of a fatty acid having from 3 to 30 carbon atoms, and particularly preferably from 12 to 30 carbon atoms. Examples thereof also include metal salts of a dimer acid and a trimer acid of the aforementioned fatty acids, and a dicarboxylic acid having from 3 to 30 carbon atoms. Among these, metal salts of a fatty acid having from 12 to 30 carbon atoms and a dicarboxylic acid having from 3 to 30 carbon atoms are particularly preferred.

The metal constituting the metal salt is preferably an alkali metal or an alkaline earth metal, and an alkali metal is particularly preferred.

Examples of the extreme pressure agent further include, in addition to the aforementioned extreme pressure agents, a sulfur extreme pressure agent, such as a sulfurized oil, a sulfurized fatty acid, a sulfurized ester, a sulfurized olefin, a dihydrocarbyl polysulfide, a thiocarbamate compound, a thioterpene compound and a dialkyl thiodipropionate compound.

The mixed amount of the extreme pressure agent is preferably from 0.001 to 5% by mass, and more preferably from 0.005 to 3% by mass, based on the total amount of the composition, from the standpoint of the lubricating property and the stability. The extreme pressure agent may be used solely or as a combination of two or more kinds thereof.

(Oiliness Agent)

Examples of the oiliness agent include an aliphatic saturated or unsaturated monocarboxylic acid, such as stearic acid and oleic acid, a polymerized fatty acid, such as a dimer acid and a hydrogenated dimer acid, a hydroxyfatty acid, such as ricinolein acid and 12-hydroxystearic acid, an aliphatic saturated or unsaturated monoalcohol, such as lauryl alcohol and oleyl alcohol, an aliphatic saturated or unsaturated monoamine, such as stearylamine and oleylamine, an aliphatic saturated or unsaturated monocarboxylic acid amide, such as lauric acid amide and oleic acid amide, and a partial ester of a polyhydric alcohol, such as glycerin and sorbitol, and an aliphatic saturated or unsaturated monocarboxylic acid.

These compounds may be used solely or as a combination of two or more kinds thereof. The mixed amount thereof is preferably from 0.01 to 10% by mass, and more preferably from 0.1 to 5% by mass, based on the total amount of the composition.

(Antioxidant)

As the antioxidant, a phenol antioxidant, such as 2,6-di-tert-butyl-4-methylphenol, 2,6-di-tert-butyl-4-ethylphenol and 2,2'-methylenebis(4-methyl-6-tert-butylphenol), and an amine antioxidant, such as phenyl-α-naphthylamine and N,N'-diphenyl-p-phenylenediamine, are preferably mixed. The antioxidant is preferably mixed in an amount of from 0.01 to 5% by mass, and more preferably from 0.05 to 3% by mass, in the composition, from the standpoint of the advantages and the economy.

(Acid Scavenger)

Examples of the acid scavenger include an epoxy compound, such as phenyl glycidyl ether, an alkyl glycidyl ether, an alkylene glycol glycidyl ether, cyclohexene oxide, an α-olefin oxide and an epoxidized soybean oil, and in particular, at least one member selected from a glycidyl ester, a glycidyl ether and an α-olefin oxide is preferably used as the acid scavenger.

Examples of the glycidyl ester include a glycidyl ester of a linear, branched or cyclic, saturated or unsaturated, aliphatic carboxylic acid or aromatic carboxylic acid generally having from 3 to 30 carbon atoms, preferably from 4 to 24 carbon atoms, and more preferably from 6 to 16 carbon atoms. The aliphatic carboxylic acid and the aromatic carboxylic acid may be a monocarboxylic acid or a polycarboxylic acid. In the case of the polycarboxylic acid, all the carboxyl groups are preferably converted to a glycidyl ester from the standpoint of suppressing an increase in the acid value for the stability of the lubricating oil composition.

Among these, a glycidyl ester of a linear, branched or cyclic saturated aliphatic monocarboxylic acid having from 6 to 16 carbon atoms is particularly preferred. Examples of the glycidyl ester include glycidyl 2-ethylhexanoate, glycidyl 3,5,5-trimethylhexanoate, glydidyl caprate, glycidyl laurate, glycidyl versatate and glycidyl myristate.

Examples of the glycidyl ether include a glycidyl ether derived from a linear, branched or cyclic, saturated or unsaturated, aliphatic, monohydric or polyhydric alcohol generally having from 3 to 30 carbon atoms, preferably from 4 to 24 carbon atoms, and more preferably from 6 to 16 carbon atoms, or an aromatic compound having at least one hydroxyl group. In the case of the aliphatic polyhydric alcohol and the aromatic compound having two or more hydroxyl groups, all the hydroxyl groups are preferably converted to a glycidyl ether from the standpoint of suppressing an increase in the hydroxyl group value for the stability of the lubricating oil composition.

Among these, a glycidyl ether derived from a linear, branched or cyclic saturated aliphatic monohydric alcohol having from 6 to 16 carbon atoms is particularly preferred. Examples of the glycidyl ether include 2-ethylethyl glycidyl ether, isononyl glycidyl ether, caprinoyl glycidyl ether, lauryl glycidyl ether and myristyl glycidyl ether.

The α-olefin oxide used is generally a compound having from 4 to 50 carbon atoms, preferably from 4 to 24 carbon atoms, and more preferably from 6 to 16 carbon atoms.

In the present invention, the acid scavenger may be used solely or as a combination of two or more kinds thereof. The mixed amount thereof is generally in a range of from 0.005 to 10% by mass, and preferably in a range of from 0.005 to 6% by mass, based on the total amount of the composition, from the standpoint of the advantages and the suppression of sludge formation.

(Metal Deactivator and Defoaming Agent)

Examples of the metal deactivator include a copper deactivator, such as N—[N,N'-dialkyl(alkyl group having from 3 to 12 carbon atoms)aminomethyl]triazole, and examples of the defoaming agent include a silicone oil and a fluorinated silicone oil.

[Lubricating Method of Refrigerating Machine, in which Lubricating Oil Composition for Refrigerating Machine is used]

The lubricating oil composition for a refrigerating machine of the present invention may be preferably applied to a refrigerating machine that uses a refrigerant containing at least one fluorine-containing organic compound selected from compounds represented by the molecular formula (A), or a combination of the fluorine-containing organic compound and a saturated fluorinated hydrocarbon compound. In particular, the lubricating oil composition is suitable for a refrigerating machine that uses a refrigerant containing an unsaturated fluorinated hydrocarbon compound.

In the lubricating method of the refrigerating machine that uses the lubricating oil composition for a refrigerating machine of the present invention, the amount used of the refrigerant and the lubricating oil composition for a refrigerating machine is preferably from 99/1 to 10/90, and more preferably from 95/5 to 30/70, in terms of the mass ratio (refrigerant)/(lubricating oil composition for refrigerating machine). When the amount of the refrigerant is smaller than the range, the refrigeration capability may be unfavorably decreased, and when the amount of the refrigerant is larger than the range, the lubricating capability may be unfavorably decreased. The lubricating oil composition for a refrigerating machine of the present invention may be applied to various types of refrigerating machines, and may be applied particularly preferably to a compression refrigeration cycle of a compression refrigerating machine.

[Refrigerating Machine]

The refrigerating machine, to which the lubricating oil composition for a refrigerating machine of the present invention is applied, has a refrigeration cycle constituted by essential components including a compressor, a condenser, an expansion mechanism (such as an expansion valve) and an evaporator, or including a compressor, a condenser, an expansion mechanism, a dryer and an evaporator, and uses the lubricating oil composition for a refrigerating machine of the present invention as a refrigerating machine oil, and the aforementioned various types of refrigerants as a refrigerant.

In the dryer, a desiccant containing zeolite having a pore diameter of 0.33 nm or less is preferably filled. Examples of the zeolite include natural zeolite and synthetic zeolite, and the zeolite more preferably has a $CO_2$ gas absorption capacity of 10 or less at 25° C. and a $CO_2$ gas partial pressure of 33 kPa. Examples of the synthetic zeolite include XH-9 and XH-600, trade names, produced by Union Showa Co., Ltd.

In the present invention, the use of the desiccant efficiently removes water without absorption of the refrigerant in the refrigeration cycle, and simultaneously prevents the desiccant from becoming powder due to deterioration thereof, thereby preventing clogging of the piping caused by the powder, and abnormal abrasion caused by invasion of the powder into the sliding members of the compressor, and consequently the refrigerating machine can be operated stably for a prolonged period of time.

The refrigerating machine, to which the lubricating oil composition for a refrigerating machine of the present invention is applied, has various sliding members (such as a bearing) in the compressor. In the present invention, the sliding members may be formed of engineering plastics or may have an organic coating film or an inorganic coating film in view particularly of the sealing property.

Preferred examples of the engineering plastics include a polyamide resin, a polyphenylene sulfide resin and polyacetal resin, from the standpoint of the sealing property, the sliding property, the wear resistance and the like.

Examples of the organic coating film include a fluorine-containing resin coating film (such as a polytetrafluoroethylene coating film), a polyimide coating film, a polyamideimide coating film, and a thermosetting insulating film formed with a resin coating composition containing a resin base material containing a polyhydroxy ether resin and a polysulfone resin, and a crosslinking agent, from the standpoint of the sealing property, the sliding property, the wear resistance and the like.

Examples of the inorganic coating film include a graphite film, a diamond-like carbon film, a nickel film, a molybdenum film, a tin film and a chromium film, from the standpoint of the sealing property, the sliding property, the wear resistance and the like. The inorganic coating film may be formed by plating processing or PVD (physical vapor deposition).

The sliding members may be formed of an ordinary alloy system, such as an Fe-based alloy, an Al-based alloy and a Cu-based alloy.

[System, to which Refrigerating Machine Oil Composition is Applied]

The lubricating oil composition for a refrigerating machine of the present invention may be used for a car air conditioner, an electric car air conditioner, a gas heat pump, an air conditioner, a refrigerator, a hot water supply system for an automatic vending machine or a showcase, and a refrigerating-heating system.

In the present invention, the water content in the system is preferably 300 ppm by mass or less, and preferably 200 ppm by mass or less, and the residual air partial pressure therein is preferably 10 kPa or less, and more preferably 5 kPa or less.

The lubricating oil composition for a refrigerating machine of the present invention contains the particular oxygen-containing compound as a major component, as a base oil, has a low viscosity for enhancing the energy saving property, and is excellent in sealing property.

EXAMPLE

The present invention will be described in more detail with reference to Examples below, but the present invention is not limited to the examples.

The properties of the base oil and the characteristics of the lubricating oil composition for a refrigerating machine were obtained according to the following manners.

<Properties of Base Oil>

(1) Kinematic Viscosity at 100° C.

The kinematic viscosity at 100° C. was measured with a glass capillary viscometer according to JIS K2283-1983.

(2) Number Average Molecular Weight

The number average molecular weight was measured with gel permeation chromatography (GPC). The GPC used was HLC-8120GPC, SC-8020 (produced by Tosoh Corporation), and the measurement was performed with THF (tetrahydrofuran) as an eluent and an IR detector. The number average molecular weight was obtained from the measurement result with the calibration curve according to the polystyrene standard samples.

(3) Flash Point

The flash point was measured according to JIS K2265 (COC method).

(4) Viscosity Index

The viscosity index was measured according to JIS K2283.

<Thermal Stability Test of Lubricating Oil Composition for Refrigerating Machine>

An oil-refrigerant mixture (ratio: 30 g/30 g, water content in oil: 500 ppm) and a metal catalyst containing iron, copper and aluminum were charged in an autoclave having an internal capacity of 200 mL, which was then sealed, and the autoclave was maintained under conditions of an air pressure of 18.7 kPa and a temperature of 175° C. for 336 hours. Thereafter, the appearance of the oil, the appearance of the catalyst and the presence of sludge were observed visually, and the acid value was measured. The acid value was measured by an indicator method according to the lubricating oil neutralization test method defined in JIS K2501.

<Mixed Components>

The components used for preparing the lubricating oil compositions for a refrigerating machine are shown below.

(1) Base Oil

A1: polyethyl vinyl ether (kinematic viscosity at 100° C.: 15.97 $mm^2$/s, flash point: 222° C., number average molecular weight: 1,250, viscosity index: 85)

A2: polypropylene glycol dimethyl ether (kinematic viscosity at 100° C.: 9.25 $mm^2$/s, flash point: 212° C., number average molecular weight: 1,139, viscosity index: 207)

A3: polypropylene glycol (PPG)-polyethyl vinyl ether (PEV) copolymer (PPG/PEV molar ratio: 7/11) (kinematic viscosity at 100° C.: 9.56 $mm^2$/s, flashpoint: 218° C., number average molecular weight: 1,200, viscosity index: 140)

A4: pentaerythritol octanoate (C8 acid) nonanoate (C9 acid) ester (C8 acid/C9 acid molar ratio: 1/1.1) (kinematic viscosity at 100° C.: 9.64 $mm^2$/s, flash point: 268° C., number average molecular weight: 670, viscosity index: 126)

(2) Oxygen Scavenger (Organic Compound having Two or more Double Bonds in Molecule)

B1: 1,4-p-menthadiene
B2: 1,4-cyclohexadiene
B3: 1,4-hexadiene
B4: 2,5-norbornadiene (3) Other Additives The following components were used and added in such a manner that the contents of the components with respect to the total amount of the composition were the amounts in the parenthesis (% by mass), thereby making the total content of the components of 0.70% by mass.

Acid scavenger: 2-ethylhexyl glycidyl ether (0.3% by mass)
Antioxidant: 2,6-di-t-butyl-4-methylphenol (0.3% by mass)
Defoaming agent: silicone defoaming agent (0.1% by mass)

Examples 1 to 7 and Comparative Examples 1 to 6

Refrigerating machine oil compositions having the formulations shown in Table 1 were prepared, and the compositions were evaluated for thermal stability by using HFO1234yf (2,3,3,3-tetrafluoropropene) as a refrigerant. The results obtained are shown in Table 1.

TABLE 1

| | | | Example | | | | | | |
|---|---|---|---|---|---|---|---|---|---|
| | | | 1 | 2 | 3 | 4 | 5 | 6 | 7 |
| Formulation (% by mass) | Base oil | A1 | 97.9 | 98.5 | 98.5 | 98.4 | — | — | — |
| | | A2 | — | — | — | — | 97.9 | — | — |
| | | A3 | — | — | — | — | — | 97.9 | — |
| | | A4 | — | — | — | — | — | — | 97.9 |
| | Oxygen scavenger | B1 | 1.4 | — | — | — | 1.4 | 1.4 | 1.4 |
| | | B2 | — | 0.8 | — | — | — | — | — |
| | | B3 | — | — | 0.8 | — | — | — | — |
| | | B4 | — | — | — | 0.9 | — | — | — |
| | Other additives | | 0.7 | 0.7 | 0.7 | 0.7 | 0.7 | 0.7 | 0.7 |
| Thermal stability test | Appearance of oil | | transparent | transparent | transparent | pale yellow | transparent | transparent | transparent |
| | Appearance of catalyst | | no change | no change | no change | no change | no change | no change | no change |
| | Presence of sludge | | none | none | none | none | none | none | none |
| | Acid value (mgKOH/g) | | 0.04 | 0.15 | 0.06 | 0.06 | 0.05 | 0.07 | 0.18 |

TABLE 1-continued

|  |  |  | Comparative Example | | | | | |
|---|---|---|---|---|---|---|---|---|
|  |  |  | 1 | 2 | 3 | 4 | 5 | 6 |
| Formulation (% by mass) | Base oil | A1 | 99.3 | 97.3 | 98.3 | — | — | — |
|  |  | A2 | — | — | — | 99.3 | — | — |
|  |  | A3 | — | — | — | — | 99.3 | — |
|  |  | A4 | — | — | — | — | — | 99.3 |
|  | Conjugated double bond compound [1] |  | — | 2.0 | — | — | — | — |
|  | Oxygen scavenger [2] |  | — | — | 1.0 | — | — | — |
|  | Other additives |  | 0.7 | 0.7 | 0.7 | 0.7 | 0.7 | 0.7 |
| Thermal stability test | Appearance of oil |  | yellow | yellowish green | yellowish green | yellow | yellow | orange |
|  | Appearance of catalyst |  | no change | no change | no change | no change | no change | no change |
|  | Presence of sludge |  | slight | none | none | slight | slight | slight |
|  | Acid value (mgKOH/g) |  | 0.42 | 0.28 | 0.35 | 0.40 | 0.45 | 1.36 |

Note:
[1] farnesene
[2] 1-hexadecene

Examples 8 to 11 and Comparative Examples 7 to 9

Refrigerating machine oil compositions having the formulations shown in Table 2 were prepared, and the compositions were evaluated for thermal stability by using HFO1234ze (1,3,3,3-tetrafluoropropene) as a refrigerant. The results obtained are shown in Table 2.

Examples 12 to 15 and Comparative Examples 10 to 12

Refrigerating machine oil compositions having the formulations shown in Table 3 were prepared, and the compositions were evaluated for thermal stability by using a mixed refrigerant containing 50% by mass of HFO1234yf (2,3,3,3-tetrafluoropropene) and 50% by mass of $CH_2F_2$ (HFC32) as a refrigerant. The results obtained are shown in Table 3.

TABLE 2

|  |  |  | Example | | | | Comparative Example | | |
|---|---|---|---|---|---|---|---|---|---|
|  |  |  | 8 | 9 | 10 | 11 | 7 | 8 | 9 |
| Formulation (% by mass) | Base oil | A1 | 97.9 | 98.5 | 98.5 | 98.4 | 99.3 | 97.3 | 98.3 |
|  | Oxygen scavenger | B1 | 1.4 | — | — | — | — | — | — |
|  |  | B2 | — | 0.8 | — | — | — | — | — |
|  |  | B3 | — | — | 0.8 | — | — | — | — |
|  |  | B4 | — | — | — | 0.9 | — | — | — |
|  | Conjugated double bond compound [1] |  | — | — | — | — | — | 2.0 | — |
|  | Oxygen scavenger [2] |  | — | — | — | — | — | — | 1.0 |
|  | Other additives |  | 0.7 | 0.7 | 0.7 | 0.7 | 0.7 | 0.7 | 0.7 |
| Thermal stability test | Appearance of oil |  | transparent | transparent | transparent | pale yellow | yellow | yellow | yellow |
|  | Appearance of catalyst |  | no change | no change | no change | no change | no change | no change | no change |
|  | Presence of sludge |  | none | none | none | none | slight | none | none |
|  | Acid value (mgKOH/g) |  | 0.02 | 0.09 | 0.05 | 0.03 | 0.35 | 0.25 | 0.42 |

Note:
[1] farnesene
[2] 1-hexadecene

TABLE 3

|  |  |  | Example | | | | Comparative Example | | |
|---|---|---|---|---|---|---|---|---|---|
|  |  |  | 12 | 13 | 14 | 15 | 10 | 11 | 12 |
| Formulation (% by mass) | Base oil | A1 | 97.9 | 98.5 | 98.5 | 98.4 | 99.3 | 97.3 | 98.3 |
|  | Oxygen scavenger | B1 | 1.4 | — | — | — | — | — | — |
|  |  | B2 | — | 0.8 | — | — | — | — | — |
|  |  | B3 | — | — | 0.8 | — | — | — | — |
|  |  | B4 | — | — | — | 0.9 | — | — | — |

TABLE 3-continued

| | | Example | | | | Comparative Example | | |
|---|---|---|---|---|---|---|---|---|
| | | 12 | 13 | 14 | 15 | 10 | 11 | 12 |
| | Conjugated double bond compound [1] | — | — | — | — | — | 2.0 | — |
| | Oxygen scavenger [2] | — | — | — | — | — | — | 1.0 |
| | Other additives | 0.7 | 0.7 | 0.7 | 0.7 | 0.7 | 0.7 | 0.7 |
| Thermal stability test | Appearance of oil | transparent no change | transparent no change | transparent no change | pale yellow no change | yellow no change | yellow no change | yellow no change |
| | Appearance of catalyst | | | | | | | |
| | Presence of sludge | none | none | none | none | slight | none | none |
| | Acid value (mgKOH/g) | 0.03 | 0.10 | 0.06 | 0.06 | 0.40 | 0.32 | 0.45 |

Note:
[1] farnesene
[2] 1-hexadecene

It is understood as follows from Tables 1, 2 and 3.

In all Examples 1 to 7, in which the lubricating oil compositions for a refrigerating machine of the present invention are used in the system using HFO1234yf as a refrigerant, the appearance of the oil and the appearance of the catalyst are good, and no sludge is formed, in the thermal stability test.

In all Examples 8 to 11, in which the lubricating oil compositions for a refrigerating machine of the present invention are used in the system using HFO1234ze as a refrigerant, the appearance of the oil and the appearance of the catalyst are good, and no sludge is formed, in the thermal stability test.

On the other hand, in Comparative Examples 1, 4 and 5, in which the oxygen scavenger in the present invention is not used, not only the acid value is high, but also the appearance of the oil is yellow or orange, and sludge is formed. In Comparative Examples 2 and 3, in which the organic compound having conjugated double bonds and the oxygen scavenger, which are different from those of the present invention, the appearance of the oil is yellowish green, and the acid value is high.

In Comparative Examples 8 to 10, in which HFO1234ze is used as a refrigerant, sludge is formed, and the acid value is high.

In Examples 12 to 15 and Comparative Examples 10 to 12, in which a mixed refrigerant of HFO1234yf and $CH_2F_2$ is used, the similar results as in the system using HFO1234ze are obtained.

INDUSTRIAL APPLICABILITY

The lubricating oil composition for a refrigerating machine of the present invention has a low global warming potential, is used for a refrigerating machine using a refrigerant having a particular structure, such as an unsaturated fluorinated hydrocarbon, which is a refrigerant capable of being used for existing car air conditioner system and the like, has excellent compatibility with the refrigerant, is excellent in stability, and forms no sludge in a thermal stability test.

The invention claimed is:

1. A composition, comprising a liquid mixture of a refrigerant and a lubricating oil, wherein:
   the lubricating oil comprises
   a base oil, and
   an organic compound comprising two non-conjugated double bonds and comprising at least one of a 1,4-diene structure and a bridged cyclic structure,
   the refrigerant is a fluorine-comprising organic compound of formula (A):

$$C_pO_qF_rR_s \quad (A);$$

R is Cl, Br, I, or H;
   p is an integer of from 1 to 6;
   q is an integer of from 0 to 2;
   r is an integer of from 1 to 14;
   s is an integer of from 0 to 13; and
   when q is 0, p is from 2 to 6 and the compound of formula (A) comprises a carbon-carbon unsaturated bond, and
   wherein the lubricating oil composition is suitable for a refrigerating machine.

2. The composition of claim 1, wherein the organic compound has a 1,4-diene structure.

3. The composition of claim 1, wherein the organic compound has a bridged cyclic structure.

4. The composition of claim 1, wherein a mixed amount of the organic compound is from 0.1 to 10% by mass based on a total amount of the composition.

5. The composition of claim 1, wherein
   the refrigerant further comprises a saturated fluorinated hydrocarbon compound.

6. The composition of claim 1, wherein the compound of formula (A) is an unsaturated fluorinated hydrocarbon compound, a fluorinated ether compound, a fluorinated alcohol compound, a fluorinated ketone compound, or any combination thereof.

7. The composition of claim 6, wherein the compound of formula (A) comprises, as an unsaturated fluorinated hydrocarbon compound, 1,2,3,3,3-pentafluoropropene (HFO1225ye), 1,3,3,3-tetrafluoropropene (HFO1234ze), 2,3,3,3-tetrafluoropropene (HFO1234yf), or any combination thereof.

8. The composition of claim 6, wherein the compound of formula (A) comprises, as a fluorinated ether compound, a fluorinated dimethyl ether.

9. The composition of claim 6, wherein the compound of formula (A) comprises, as a fluorinated alcohol compound, a fluorinated methyl alcohol.

10. The composition of claim 6, wherein the compound of formula (A) comprises, as a fluorinated ketone compound, a fluorinated acetone.

11. The composition of claim 1, wherein the refrigerant comprises, as a saturated fluorinated hydrocarbon compound, difluoromethane, 1,1-difluoroethane, trifluoroethane, tetrafluoroethane, pentafluoroethane, or any combination thereof.

12. The composition of claim 1, wherein the base oil comprises, as a major component, a polyoxyalkylene glycol compound, a polyvinyl ether compound, a copolymer of a poly (oxy)alkylene glycol or a monoether thereof, a polyvinyl ether, a polyol ester compound, a polycarbonate compound, or any combination thereof.

13. The composition of claim 1, wherein the base oil has a kinematic viscosity at 100° C. of from 1 to 50 mm$^2$/s.

14. The composition of claim 1, wherein the base oil has a number average molecular weight of from 300 to 3,000.

15. The composition of claim 1, wherein the base oil has a viscosity index of 60 or more.

16. The composition of claim 1, wherein the lubricating oil composition further comprises, as an additive, an extreme pressure agent, an oiliness agent, an antioxidant, an acid scavenger, a metal deactivator, a defoaming agent, or any combination thereof.

17. The composition of claim 1,
wherein the refrigerating machine comprises a sliding member, and
the sliding member comprises an engineering plastic, an organic coating film, an inorganic coating film, or any combination thereof.

18. The composition of claim 17, wherein the sliding member comprises, as an organic coating film, a polytetrafluoroethylene coating film, a polyimide coating film, a polyamideimide coating film, a thermosetting insulating film, or any combination thereof,
if the sliding member comprises a thermosetting insulating film, the thermosetting insulating film comprises a resin coating composition and a crosslinking agent, and
if the sliding member comprises a thermosetting insulating film, the resin coating composition comprises a resin base material comprising a polyhydroxy ether resin and a polysulfone resin.

19. The composition of claim 17, wherein the sliding member comprises, as an inorganic coating film, a graphite film, a diamond-like carbon film, a tin film, a chromium film, a nickel film, a molybdenum film, or any combination thereof.

20. The composition of claim 1, wherein the lubricating oil composition is suitable for a car air conditioner, an electric car air conditioner, a gas heat pump, an air conditioner, a refrigerator, an automatic vending machine hot water supply system, a showcase hot water supply system, a refrigerating-heating system, or any combination thereof.

21. The composition of claim 20, wherein the lubricating oil composition is suitable for a system wherein a water content is 300 ppm by mass or less and a residual air partial pressure therein is 10 kPa or less.

* * * * *